(12) United States Patent
Takahashi et al.

(10) Patent No.: US 8,353,569 B2
(45) Date of Patent: Jan. 15, 2013

(54) INKJET PRINTING APPARATUS AND PRINTING METHOD

(75) Inventors: Kiichiro Takahashi, Yokohama (JP); Minoru Teshigawara, Saitama (JP); Tetsuya Edamura, Kawasaki (JP); Akiko Maru, Tokyo (JP); Takatoshi Nakano, Tokyo (JP); Hiroshi Taira, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 12/636,848

(22) Filed: Dec. 14, 2009

(65) Prior Publication Data

US 2010/0156979 A1 Jun. 24, 2010

(30) Foreign Application Priority Data

Dec. 19, 2008 (JP) ................................. 2008-323801

(51) Int. Cl.
*B41J 29/38* (2006.01)
(52) U.S. Cl. ........................................................ 347/14
(58) Field of Classification Search ................ 347/14, 347/19

See application file for complete search history.

(56) References Cited

U.S. PATENT DOCUMENTS

| 5,852,454 A | 12/1998 | Kanematsu et al. |
| 5,975,678 A | 11/1999 | Kanematsu et al. |
| 6,164,756 A | 12/2000 | Takahashi et al. |
| 6,669,331 B2 | 12/2003 | Teshigawara et al. |
| 6,729,710 B2 | 5/2004 | Chikuma et al. |
| 7,350,893 B2 | 4/2008 | Teshigawara et al. |
| 2002/0021317 A1 | 2/2002 | Chikuma et al. |
| 2002/0039122 A1* | 4/2002 | Chikuma et al. ................. 347/41 |
| 2004/0207674 A1* | 10/2004 | Otsuki ............................ 347/19 |
| 2005/0248606 A1* | 11/2005 | Hoshiyama et al. ............ 347/19 |
| 2009/0051940 A1 | 2/2009 | Murayama et al. |

FOREIGN PATENT DOCUMENTS

JP 2002-96460 A 4/2002

* cited by examiner

*Primary Examiner* — Laura Martin
(74) *Attorney, Agent, or Firm* — Fitzpatrick, Cella, Harper, Scinto

(57) ABSTRACT

In an inkjet printing method of performing printing on a printing medium by ejecting inks from a printing head configured to eject chromatic inks and an achromatic ink while moving the printing head, high-quality printing with few boundary stripes produced when the amount of inks is large is realized without complicated control being performed. To this end, print data in a boundary and the vicinity thereof is divided into unit regions, and for each unit region, performed are (A) a first reduction processing which determines a hue of the unit region based on amounts of the chromatic inks, and reduces the amount of chromatic inks applied to the unit region according to the determined hue; and (B) a second reduction processing which reduces an amount of achromatic ink based on the amount of achromatic ink applied to the unit region.

8 Claims, 24 Drawing Sheets

| THINNING RANK | THINNING DATA | THINNING RATE |
|---|---|---|
| 0 | 11111111 | 0/8=0% |
| 1 | 01111111 | 1/8=12.5% |
| 2 | 01110111 | 2/8=25.0% |
| 3 | 01010111 | 3/8=37.5% |
| 4 | 01010101 | 4/8=50.0% |
| 5 | 00010101 | 5/8=62.5% |
| 6 | 00010001 | 6/8=75.0% |
| 7 | 00000001 | 7/8=87.5% |
| 8 | 00000000 | 8/8=100% |

FIG. 12

PRINT DATA(ORIGINAL DATA)   (THINNING DATA)
○×○○○×○×××○○×   01110111

[FIRST PIECE OF EJECTION DATA]
   (BEFORE PROCESSING)
○×○○○×○×××○○×   01110111

(AFTER PROCESSING)
×︎×○○○×○×××○○×   01110111

[SECOND PIECE OF EJECTION DATA]
   (BEFORE PROCESSING)
××○○○×○×××○○×   01110111

(AFTER PROCESSING)
××○○○×○×××○○×   01110111

[RESULT OF THINNING PROCESSING]
   ORIGINAL DATA

○×○○○×○×××○○×
   AFTER PROCESSING DATA
××○○○××××○○×

FIG. 13

| FIRST INK / SECOND INK | 0~10% | 10~20% | 20~30% | 30~40% | 40~50% | 50~60% | 60~70% | 70~80% | 80~90% | 90~100% |
|---|---|---|---|---|---|---|---|---|---|---|
| 0~10% | REGION 1 | REGION 1 | REGION 2 | REGION 2 | REGION 2 | REGION 3 | REGION 3 | REGION 3 | REGION 3 | REGION 4 |
| 10~20% | REGION 1 | REGION 2 | REGION 2 | REGION 2 | REGION 2 | REGION 3 | REGION 3 | REGION 3 | REGION 3 | REGION 4 |
| 20~30% | REGION 1 | REGION 2 | REGION 2 | REGION 2 | REGION 2 | REGION 3 | REGION 3 | REGION 3 | REGION 4 | REGION 4 |
| 30~40% | REGION 1 | REGION 2 | REGION 2 | REGION 2 | REGION 2 | REGION 3 | REGION 3 | REGION 3 | REGION 4 | REGION 4 |
| 40~50% | REGION 1 | REGION 2 | REGION 2 | REGION 2 | REGION 2 | REGION 3 | REGION 3 | REGION 4 | REGION 4 | REGION 4 |
| 50~60% | REGION 1 | REGION 2 | REGION 2 | REGION 2 | REGION 2 | REGION 3 | REGION 4 | REGION 4 | REGION 4 | REGION 4 |
| 60~70% | REGION 1 | REGION 2 | REGION 2 | REGION 2 | REGION 2 | REGION 4 | REGION 4 | REGION 4 | REGION 4 | REGION 4 |
| 70~80% | REGION 1 | REGION 2 | REGION 2 | REGION 2 | REGION 2 | REGION 4 | REGION 4 | REGION 4 | REGION 4 | REGION 4 |
| 80~90% | REGION 1 | REGION 2 | REGION 2 | REGION 2 | REGION 2 | REGION 4 | REGION 4 | REGION 4 | REGION 4 | REGION 4 |
| 90~100% | REGION 1 | REGION 2 | REGION 2 | REGION 2 | REGION 2 | REGION 4 | REGION 4 | REGION 4 | REGION 4 | REGION 4 |

FIG. 17

| LIGHTNESS REGION | THINNING RANK | THINNING DATA | THINNING RATE |
|---|---|---|---|
| REGION 1 | 0 | 11111111 | 0/8=0% |
| REGION 2 | 1 | 01111111 | 1/8=12.5% |
| REGION 3 | 2 | 01110111 | 2/8=25.0% |
| REGION 4 | 4 | 01010101 | 4/8=50.0% |

FIG. 18A

| FIRST INK / SECOND INK | 0~10% | 10~20% | 20~30% | 30~40% | 40~50% | 50~60% | 60~70% | 70~80% | 80~90% | 90~100% |
|---|---|---|---|---|---|---|---|---|---|---|
| 0~10% | 0% | 0% | 4% | 8% | 12% | 16% | 22% | 30% | 36% | 44% |
| 10~20% | 0% | 0% | 4% | 8% | 12% | 16% | 22% | 30% | 36% | 44% |
| 20~30% | 0% | 2% | 4% | 8% | 12% | 16% | 22% | 30% | 30% | 46% |
| 30~40% | 0% | 2% | 4% | 8% | 12% | 16% | 22% | 30% | 30% | 46% |
| 40~50% | 0% | 2% | 4% | 8% | 12% | 18% | 24% | 32% | 32% | 48% |
| 50~60% | 0% | 2% | 6% | 10% | 14% | 18% | 24% | 32% | 32% | 48% |
| 60~70% | 0% | 2% | 6% | 10% | 14% | 18% | 26% | 34% | 34% | 50% |
| 70~80% | 0% | 2% | 6% | 10% | 14% | 18% | 26% | 34% | 34% | 50% |
| 80~90% | 0% | 2% | 6% | 10% | 14% | 20% | 28% | 36% | 36% | 50% |
| 90~100% | 0% | 2% | 6% | 10% | 14% | 20% | 28% | 36% | 36% | 50% |

FIG. 18B

INKJET PRINTING APPARATUS AND PRINTING METHOD

BACKGROUND OF THE INVENTION

1. Field of the Invention

The present invention relates to an inkjet printing apparatus and a printing method, and more particularly relates to an inkjet printing apparatus and a printing method that are suitably applied to inkjet printing in which a printing head moves to the same image area on a printing medium one or more times to achieve the printing. Moreover, the present invention can be applied to any apparatus that performs printing on a printing medium such as paper, cloth, leather, nonwoven fabric, OHP plastic film, even metal or the like. Specifically, the applicable apparatuses include office machines such as a printer, a copy machine and a facsimile machine, and industrial manufacturing machines such as a print machine and a printing machine.

2. Description of the Related Art

There is an inkjet printing method that employs a so-called serial printing method that performs printing an image on a printing medium by alternately repeating operation of ejecting ink while moving a printing head and operation of conveying the printing medium. In such an inkjet printing method, a band-like image area (band) is formed by one movement (pass) of the printing head.

When the printing is performed in one pass on a region printable by one movement of the printing head on a printing medium, an amount of ink applied to the printing medium at a time is larger than that applied when multi-pass printing for forming an image in a plurality of passes is performed. Hence, in the one pass printing, a stripe is more likely to occur although the degree thereof depends on the printing medium and the property of the ink, because a printing density becomes high at adjacent ends (a boundary between adjacent bands). This stripe is also called a "connecting stripe" or "boundary stripe". When the "boundary stripes" are produced, the printing quality is likely to be reduced to an extremely low level.

To solve the foregoing problem, in Japanese Patent Laid-Open No. 2002-96460, there is proposed a method which reduces boundary stripes by reducing the amount of ink applied to the vicinity of the boundary. In the technology disclosed in Japanese Patent Laid-Open No. 2002-96460, boundary stripes are reduced by determining a hue in the region of interest which is the target of the above-described reduction processing and by reducing the amount of ink at a reduction rate corresponding to the hue (for convenience, hereinafter referred to as boundary processing based on hue determination).

However, as the higher quality of color images has been required in recent years in particular, the number of colors (the number of types of ink) that are used in printing has tended to increase; also when performing processing to reduce the boundary stripes, it tends to be insufficient to target only basic colors.

For example, Japanese Patent Laid-Open No. 2002-96460 discloses a configuration in which not only color inks of chromatic colors, which are three primary colors (cyan, magenta and yellow) of printing, but also an ink of black as an achromatic color is used. Here, Japanese Patent Laid-Open No. 2002-96460 only discloses the processing to reduce the amount of color inks to be applied without consideration of the black ink. This is because, when data in which black and colors are mixed is printed, black is printed at least one scan earlier than colors are printed. Specifically, when colors are printed, black ink has already been fixed on the printing medium, and this reduces the effects of the black ink on the production of boundary stripes. However, in order to effectively reduce the boundary stripes, it is necessary to take black into consideration. In this case, it can be considered that the above-described boundary processing based on hue determination is also performed on the data of the black ink. However, since the black ink substantially has no hue, in order to effectively reduce the boundary stripes attributable to the black ink, instead of performing the boundary processing based on hue determination, it is preferable to design boundary processing unique to the black ink having no hue. In the black ink actually used, its colorant (a dye or a pigment) itself has a slight color, and thus it does not necessarily have a hue at all (in other words, a=b=0 in a Lab color space). However, since the color of the black ink is a color that is present in the vicinity of an L axis in the Lab color space, it may be treated as substantially having no hue.

SUMMARY OF THE INVENTION

The present invention has been made in view of the foregoing problem, and has an object to suppress not only boundary stripes attributable to chromatic inks but also boundary stripes attributable to achromatic inks.

In an aspect of the present invention, there is provided an inkjet printing apparatus which performs printing on a printing medium by ejecting ink from a printing unit configured to eject different chromatic ink and an achromatic ink while moving the printing unit relative to the printing medium, comprising:

an acquiring unit configured to acquire, for each unit region obtained by dividing a region including a vicinity of a boundary between bands to be printed by movements of the printing unit , information on amounts of inks to be applied to the unit region; and a reduction processing unit configured to perform a first reduction processing which determines a hue of the unit region based on the information on the amounts of the chromatic ink to be applied to the unit region acquired by the acquiring unit and reduces each of the amounts of the chromatic ink to be applied to the unit region according to the determined hue; and a second reduction processing which reduces the amount of the achromatic ink to be applied to the unit region based on the information on the amount of the achromatic ink to be applied to the unit region acquired by the acquiring unit.

In another aspect of the present invention, there is provided an inkjet printing method of performing printing on a printing medium by ejecting ink from a printing unit configured to eject different chromatic ink and an achromatic ink while moving the printing unit relative to the printing unit, comprising the steps of:

acquiring, for each unit region obtained by dividing a region including a vicinity of a boundary between bands printed by movements of the printing unit , information on amounts of ink to be applied to the unit region; and performing a first reduction processing which determines a hue of the unit region based on the information on the amounts of the chromatic ink to be applied to the unit region acquired by the acquiring step and reduces each of the amounts of the chromatic ink to be applied to the unit region according to the determined hue; and a second reduction processing which reduces the amount of the achromatic ink to be applied to the unit region based on the information on the amount of the achromatic ink applied to the unit region acquired by the acquiring step.

In the present invention, the boundary processing according to the color gamut determination is applied to the chromatic colors, while the boundary processing according to the lightness determination is applied to the achromatic colors. As described above, the unique processing is performed for each of the chromatic inks and the achromatic inks according to the color properties of the inks, and thus it is possible to obtain a high-quality image in which boundary stripes are suppressed.

Further features of the present invention will become apparent from the following description of exemplary embodiments (with reference to the attached drawings).

BRIEF DESCRIPTION OF THE DRAWINGS

FIG. 12 is a diagram illustrating the relationship among the thinning rank (thinning level), thinning data corresponding to the thinning level and a thinning rate;

FIG. 13 is a diagram showing the thinning processing of the first embodiment;

FIG. 17 is a diagram showing an example of a table showing the relationship between the number of dots applied and a lightness region when first and second inks are used;

FIG. 18A is a diagram showing a table that specifies a correlation between lightness and a thinning rate, and FIG. 18B is a diagram showing a table that specifies a correlation between the number of dots of an achromatic ink and a thinning rate;

DESCRIPTION OF THE EMBODIMENTS

The present invention will be described below with reference to the accompanying drawings.

1. First Embodiment (The Configuration of a Printing Apparatus)

Figure 1:
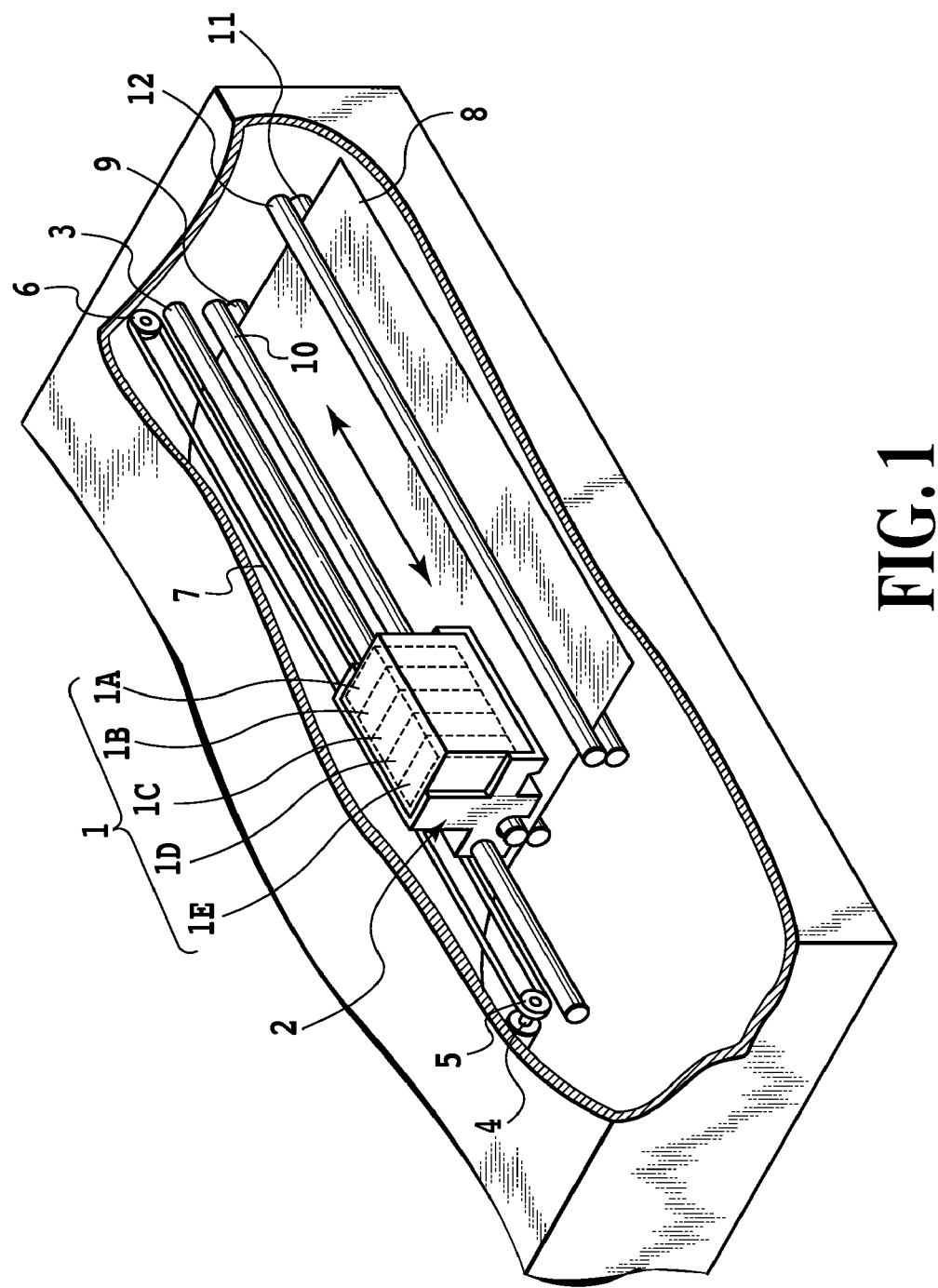
FIG. 1 is a perspective view schematically showing the configuration of main structures of an inkjet printing apparatus to which the present invention is applicable.

FIG. 1 is a perspective view schematically showing the configuration of main portions of an inkjet printing apparatus to which the present invention is applicable. In FIG. 1, the reference numerals 1A, 1B, 1C, 1D and 1E represent printing heads, which are detachably mounted on a carriage 2 independent of each other. Each of the printing heads 1A to 1E is provided with a connector for receiving signals that drive the printing head. In the following description, when the printing heads 1A to 1E are not specified, and all or any one of them is indicated, it is simply referred to as a printing head 1.

The printing heads 1A, 1B, 1C, 1D and 1E eject inks of different color tones (color and density). In this example, the printing heads 1A, 1B and 1C eject chromatic inks, namely, cyan, magenta and yellow inks, respectively. The printing heads 1D and 1E eject achromatic inks, namely, black and light black inks, respectively. Each of the printing heads is provided, separably or inseparably, integrally with an ink tank that contains the ink of the corresponding color. Each printing head 1 is positioned and detachably mounted in the carriage 2. The carriage 2 is provided with a connector holder (an electrical boundary) for transmitting the drive signals or the like to each printing head 1 through the connector.

The carriage 2 is supported and guided such that it can move in a direction indicated by arrows along a guide shaft 3 provided in the main body of the printing apparatus. The carriage 2 is driven by a carriage motor 4 through a motor pulley 5, a driven pulley 6 and a timing belt 7, and thus its position and movement are controlled.

A printing medium 8 such as paper or a plastic thin plate is conveyed in a direction intersecting the movement direction of the carriage according to the rotation of two pairs of conveyance rollers 9; 10 and 11; 12 so as to pass through a position (a position where the printing is performed) opposite to a face (an ejection opening formation face) of the printing head 1 where ejection openings are formed. The backside surface of the printing medium 8 is supported by a platen (not shown) at the position where the printing is performed, and thus a flat surface to be printed is formed. The two pairs of conveyance rollers also serve to support the printing medium 8 both from the upstream side and the downstream side of the conveying direction between which the position where the printing is performed is located such that the distance between the ejection opening formation face of each printing head 1 mounted on the carriage 2 and the printing medium 8 on the platen is kept to a predetermined distance.

The printing head 1 applied to this embodiment is an inkjet printing unit that is provided with: electro-thermal transducer elements that generate, as an energy used for ink ejection, a thermal energy to produce ink film boiling in response to a supplied current; and a plurality of ejection openings that eject ink.

Figure 2:
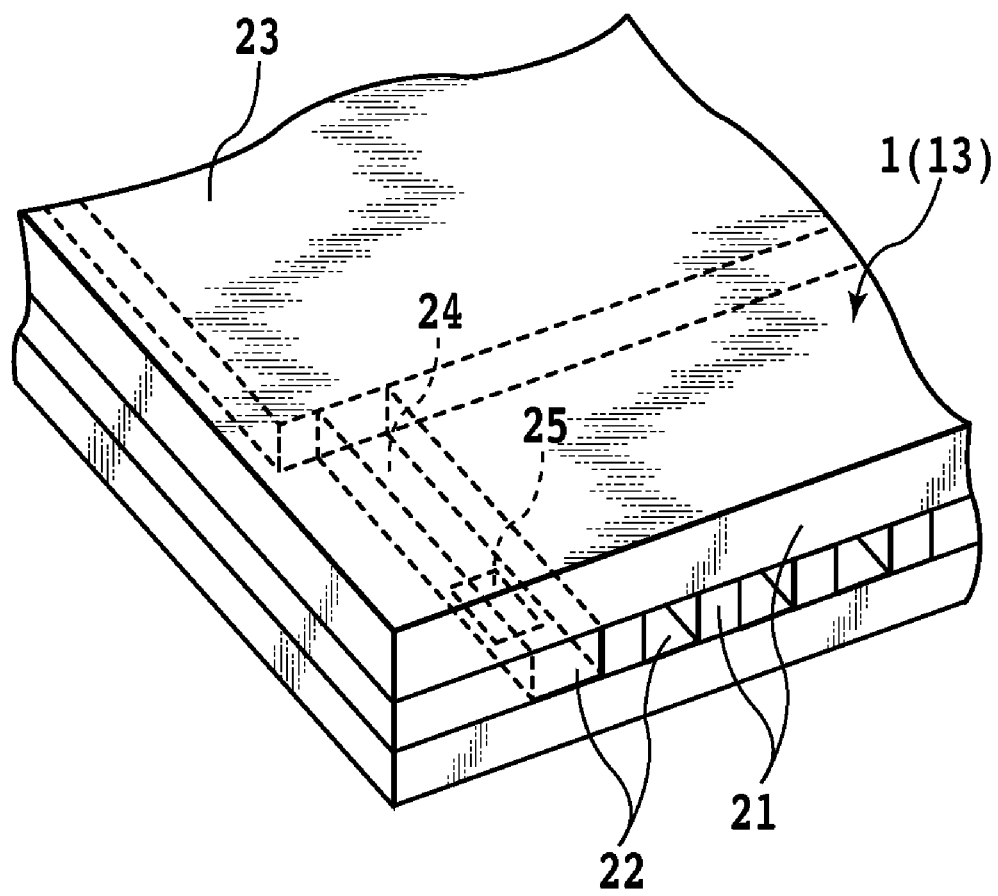
FIG. 2 is a perspective view schematically showing the main configuration of an ink ejection portion of a printing head shown in FIG. 1.

FIG. 2 is a perspective view schematically showing the main configuration of an ink ejection portion 13 of the printing head 1. In FIG. 2, an ejection opening formation face 21 is a face that faces the printing medium 8 with a predetermined gap (in this embodiment, about 0.5 to 2 mm) therebetween; in the ejection opening formation face 21, a plurality of ejection openings 22 are formed with a predetermined pitch. Each of the ejection openings 22 communicates with a common liquid chamber 23 through a plurality of liquid passages 24; the ink is filled between the common liquid chamber 23 and the ejection openings 22. In the wall surface of each of the liquid passages 24, the electro-thermal transducer element 25 (such as a heating resistor, and hereinafter also referred to as an "ejection heater") that generates the energy for ejecting the ink is disposed.

At the time of the ejection, a predetermined voltage is applied to each of the electro-thermal transducer elements 25 based on print data. Thus, the electro-thermal transducer element 25 transducers the electrical energy to the thermal energy, and the generated heat causes the film boiling of the ink within the liquid passage 24. Then, the pressure of rapidly growing bubble pushes the ink to the ejection opening 22, and a predetermined amount of ink is ejected as a drop. As described above, this embodiment is applied to the inkjet printing head that utilizes changes in pressure produced by the growth and contraction of the bubble resulting from the film boiling to eject the ink through the ejection opening 22.

In this embodiment, each of the printing heads 1 is mounted on the carriage 2 in such a position relationship that the plurality of ejection openings 22 for ejecting the same color ink are arranged in a direction intersecting the movement direction of the carriage 2. The number of ejection heaters is not particularly limited.

(The Configuration of a Control Circuit)

Figure 3:
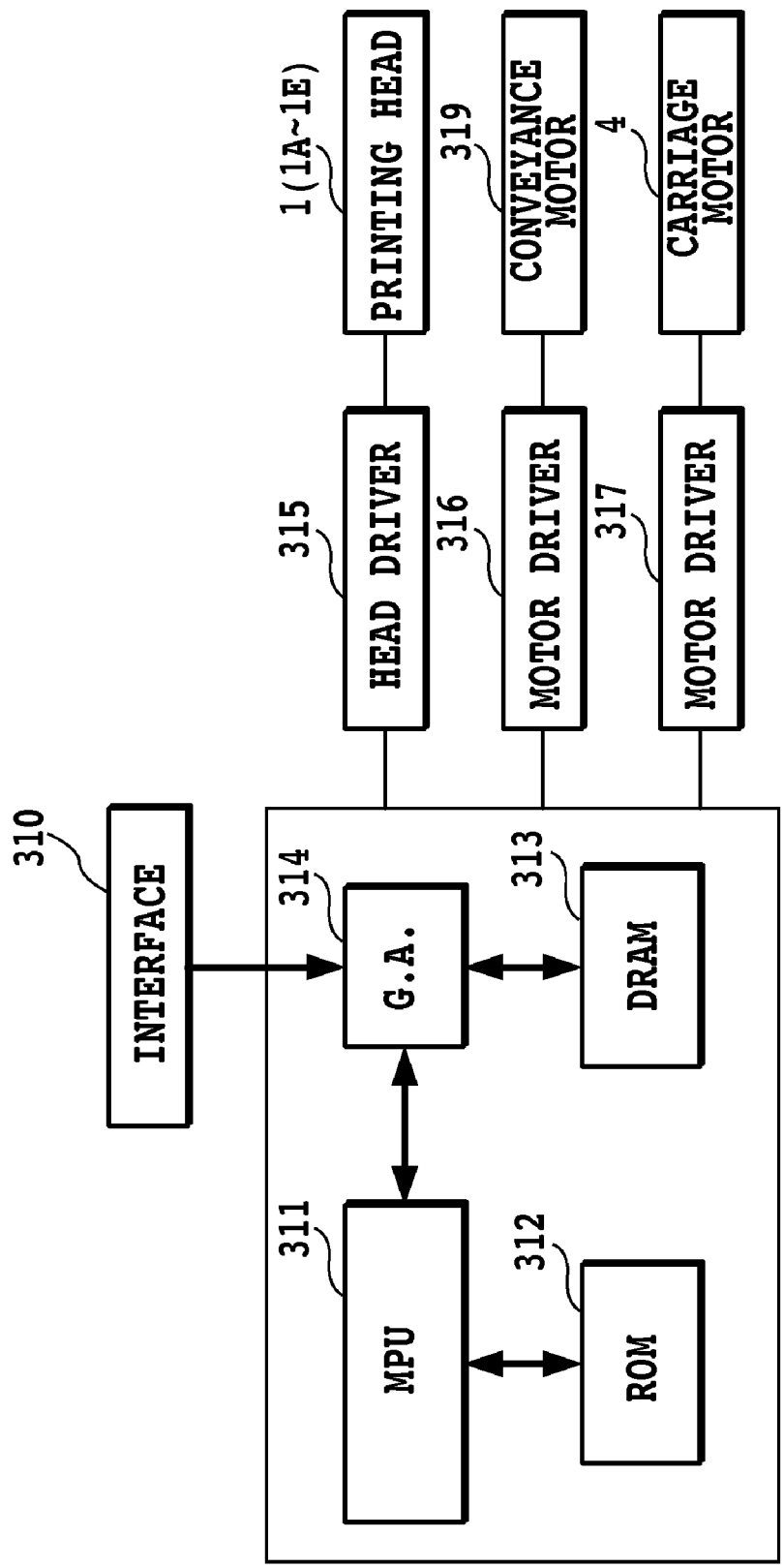
FIG. 3 is a block diagram illustrating an example of the configuration of a control circuit that controls portions of the inkjet printing apparatus shown in FIG. 1.

FIG. 3 is a block diagram illustrating an example of the configuration of a control circuit that controls portions of the inkjet printing apparatus.

In FIG. 3, reference numeral 310 represents an interface, which receives and sends the print data, a print start signal and the like from and to an external device serving as a source for supplying the print data representing an image to be printed and the like. The external device may take various forms such as a personal computer, a digital camera, a memory card, a memory chip or a scanner.

Reference numeral 311 represents an MPU, which controls the entire device according to a processing procedure or the like to be described later. Reference numeral 312 represents a ROM, which stores programs corresponding to the processing procedure performed by the MPU 311 and other fixed data. The fixed data may include data and the like corresponding to a thinning rank graph and thinning data to be described later in a table according to conditions. Reference numeral 313 represents a dynamic RAM (DRAM), which can store not only various types of data (such as the above print start signal and print data), but also information on the number of printing dots (the number of times of ink ejection by each printing head; also referred to as a dot count value), the number of times of replacement of the printing head and the like. Reference numeral 314 represents a gate array (G. A.), which controls the supply of the print data to the printing head 1 and performs a dot count processing and a boundary processing (reduction processing for reducing the amount). The gate array 314 also controls the transfer of data among the interface 310, the MPU 311 and the RAM 313.

Reference numeral 317 represents a motor driver, which drives a carriage motor 4 serving as a drive source for moving of the printing head 1 and the carriage 2. Reference numeral 319 represents a conveyance motor serving as a drive motor for conveying of the printing medium. Reference numeral 316 represents a driver for driving the conveyance motor 319. Reference numeral 315 represents a head driver for driving the printing head 1 based on the print data to eject the ink.

The operation of the configuration of the control circuit shown in FIG. 3 will be described. When multivalued print data are input to the interface 310 with the print start signal, the gate array 314 and the MPU 311 perform processing for converting the multivalued print data into binary print data for printing. The drive of the conveyance motor 319 and the carriage motor 4 is controlled through the motor drivers 316 and 317, respectively, and the printing heads 1A-1E are driven according to the binary print data transmitted to the head driver 315, thus performing the printing operation.

Figure 4:
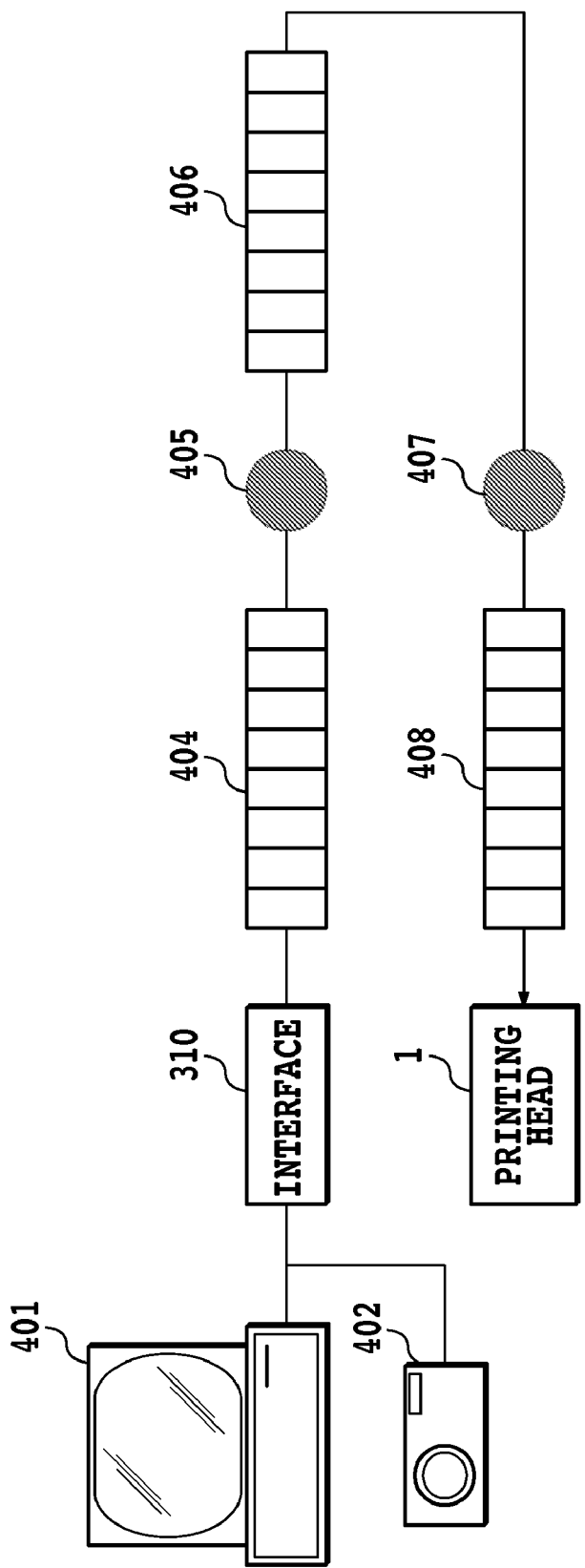
FIG. 4 is a diagram showing the flow of print data within the inkjet printing apparatus of an embodiment.

FIG. 4 is a diagram illustrating the flow of the print data within the printing apparatus of this embodiment; each buffer shown in this figure is formed in the DRAM 313 (see FIG. 3).

The multivalued print data from the external device such as a host computer 901 or a digital camera 402 is transmitted through the interface 310 to a reception buffer 404 to be stored therein. The reception buffer 404 has a capacity of a few tens of kilobytes to a few hundreds of kilobytes. Command analysis is preformed by a command analysis portion 405 on the multivalued print data stored in the reception buffer 404, and then the multivalued print data is transmitted to a work buffer 406. In the work buffer 406, the multivalued print data is stored as an intermediate form for one line, and processing for adding the printing position, the type of decoration, the size, the letter (code), the address of the font and the like of each character is performed. The capacity of the work buffer 406 is different depending on the type of the printing apparatus. For the serial printing type printing apparatus in this embodiment, the capacity can be set to be for some lines. Then, an image processing unit 407 executes image processing including binarization or the like for the multivalued print data stored in the work buffer 406 to convert the multivalued print data into the binary print data. Then, binary print data is stored in a print buffer 408. The binary print data is finally transmitted to the printing head 1. Ink is ejected from the printing head 1 based on the binary print data to print an image.

The gate array 314 of this embodiment has a dot count function and the like. Although the dot count can be performed by software processing, a dedicated circuit is preferably incorporated in the gate array 311 in terms of processing time and the like. The gate array 314 captures the binary print data from the print buffer 408, and performs the dot count for each ink color used for a region where the boundary processing is to be performed based on the binary print data corresponding to the region. Here, the "region where the boundary processing is to be performed" refers to a unit region obtained by partitioning (dividing) a region in the vicinity of the boundary as described later with reference to FIG. 7. The "boundary processing" refers to reduction processing for reducing the amount of ink applied to the unit region; in this embodiment, the processing for thinning print data corresponding to the unit region is applied as the reduction processing. The gate array 314 performs the thinning processing on the print data according to the thinning rate (the reduction rate for the amount of ink) corresponding to the results of the dot count processing as described above, and rewrites the contents of the print buffer 314 as the thinning print data resulting from the processing.

Incidentally, the boundary processing can also be performed by intervention of the MPU 311. In this case, however, since the software processing is interposed, the processing speed may be decreased. Thus, in this embodiment, the gate array 314 directly accesses the print buffer 408 to complete the boundary processing, and then rewrites the contents of the print buffer 314. In other words, in this embodiment, without the intervention of the MPU 311, it is possible to perform the boundary processing with only the function of the gate array 314.

Although, in the above description of this embodiment, the inks of cyan, magenta, yellow, black and light black are used, light color inks (such as light cyan and light magenta), so-called particular color inks (such as blue, red and green) or the like may be used.

(Control Procedure)

An embodiment of the present invention, specifically control sequence and processing, applied to the inkjet printing apparatus of the embodiment shown in FIGS. 1 to 4 will be described below.

This embodiment employs a configuration in which different types of boundary processing are performed on a chromatic ink and an achromatic ink.

Figure 5:
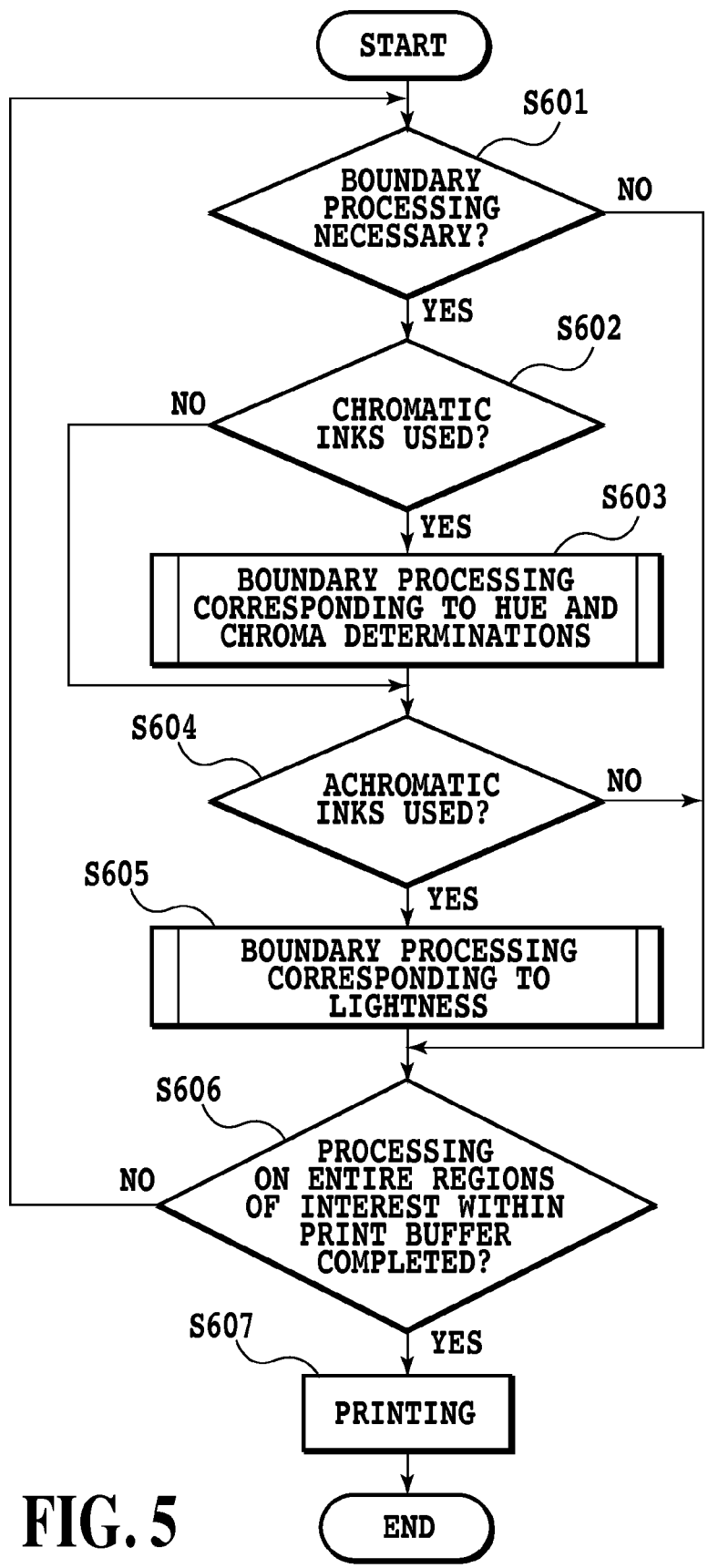
FIG. 5 is a flowchart showing a control procedure according to a first embodiment of the present invention.

FIG. 5 is a flowchart showing a control procedure according to this embodiment. This shows a series of processing in which the print start signal is first received, then the boundary processings are applied to the respective print data corresponding to the chromatic color inks and the achromatic color inks and the printing is finally started. This processing is started after print data corresponding to the region of a total of two bands (corresponding to two scans), namely, the region of band A printed in the subsequent scan and the region of band B adjacent to the region of band A is stored in the print buffer 408.

First, in step S601, whether or not the boundary processing is needed is determined. The case where the boundary processing is needed includes: the case where the amount of ink applied in one pass is large; the case where, depending on the properties of the ink, the ink cannot be sufficiently absorbed because the printing medium has a poor ability of absorbing the ink. In such cases, bleeding of ink may occur at the boundary of adjacent bands and the vicinity of the boundary. Moreover, when, for example, the printing rate is faster than the ink absorbing rate, the ink is highly likely to bleed at the boundary and the vicinity thereof and therefore the boundary processing may be needed. Thus, it is possible to previously determine whether or not the boundary processing is needed according to the applied amount of ink and the properties of the printing medium used for printing and the ink. Furthermore, it is possible to determine whether or not the boundary processing is needed according to a print mode that specifies the quality of the printing according to a user's desire.

It is possible to determine, based on the dot count value, whether or not the applied amount of ink that is large or small. When the boundary processing can be performed according to the printing medium and the quality of the printing, whether or not the boundary processing is needed can be determined based on print control information supplied along with the print start signal and the multivalued print data from the external device such as the host computer 401. The printing control information, for example, includes printing medium information and printing quality information. The printing medium information includes the type of printing medium on which printing is performed, and specifies any one of printing medium among "plain paper", "gloss paper", a "postcard" and the like. The printing quality information includes the quality of the printing, and specifies any one of "fine", "normal", "fast" and the like. The printing control information can be formed based on information specified by the user using an UI screen on the monitor of the host computer 401.

In this embodiment, when the type of printing medium is set at "plain paper" and the quality of printing is set at "fast", or when the type of printing medium is set at "gloss paper" and the quality of printing is set at "fast", the boundary processing is determined to be necessary. In the case of a setting other than described above, the boundary processing is determined to be unnecessary. If, in step S601, it is determined that the boundary processing is needed, the process proceeds to step S602, whereas, if it is determined that the boundary processing is not needed, the process proceeds to step S606.

In step S602, based on the dot count value of each color ink used in a region to be processed is made, whether or not the chromatic ink (in this embodiment, at least one of three colors, namely, cyan, magenta and yellow) is used in a unit region is determined. Here, if a positive determination is made, the process proceeds to step S603 where a hue and a chroma (hereinafter, the combination of the hue and the chroma is also referred to as a "color gamut") in the unit region are determined based on the combination of the dot count values of the chromatic inks used in the aforementioned unit region and the boundary processing corresponding to the determination is performed. If the processing in step S603 is completed and a negative determination is made in step S602, the process proceeds to step S604 where whether or not the achromatic ink (in this embodiment, at least one of black and light black) is used in the aforementioned region to be processed is determined. Black, light black (gray) and the like are colors of a lightness axis that does not have characteristics toward chroma. If these achromatic inks are used, the process proceeds to step S605. In step S605, a lightness in the unit region is determined based on the dot count value of each achromatic ink used in the unit region and the boundary processing corresponding to the lightness is performed. The above boundary processing is completed by performing the thinning processing to be described later on the binary print data stored in the print buffer 908, and then writing the thinned binary print data on the print buffer 408.

In step S606, whether or not the above-described processing is performed on all of the unit regions to potentially be processed included in the print buffer 408, and, if a negative determination is made, the above-described processing is repeated, whereas, if a positive determination is made, the process proceeds to step S607. In step S607, the printing for one scan is performed according to the print data other than the vicinity of the boundary and the print data (that has undergone the boundary processing or that has not undergone the boundary processing) of the vicinity of the boundary written in the print buffer 408. Thus, the printing for one band is completed. The above-described procedure can be repeated until the completion of the printing for, for example, one page.

(Boundary Processing Corresponding to Color Gamut)

Figure 6:
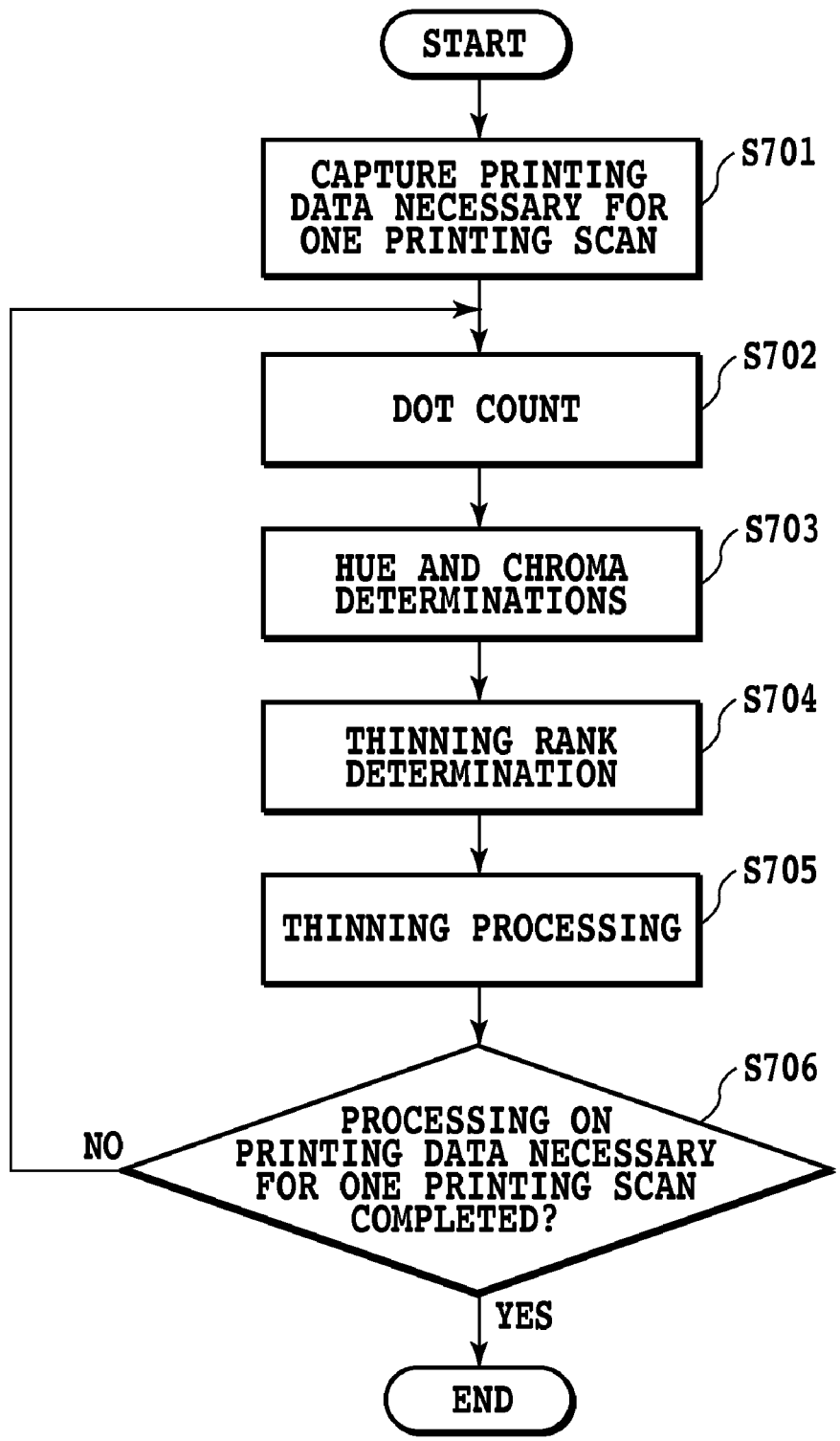
FIG. 6 is a flowchart showing the details of processing for reducing the amount of ink applied according to a hue that is performed in the procedure shown in FIG. 5.

FIG. 6 is a flowchart showing the details of the boundary processing performed in step S603. In step S701, print data corresponding to each color ink and necessary for the printing of one print scan is acquired. Here, the "necessary print data" refers to not only print data corresponding to regions. on a band formed in one print scan to be performed from this time but also print data corresponding to regions on a band formed in the succeeding print scan.

After these print data are acquired, for each of a plurality of unit regions (in this embodiment, a region of 16 dots in a raster direction and 16 dots in a column direction) obtained by dividing a region in the vicinity of the boundary, dot count (the count of the number of "1 (ejection)" in the print data within the unit region) is performed in step S702. Then, a color gamut determination (step S703), a thinning rank determination (step S704) and the thinning processing (step S705) are performed, and these processings are repeated until the completion of the processing on the print data necessary for the printing of one print scan (step S706). Each processing will be described in detail below.

Dot Count

Figure 7:
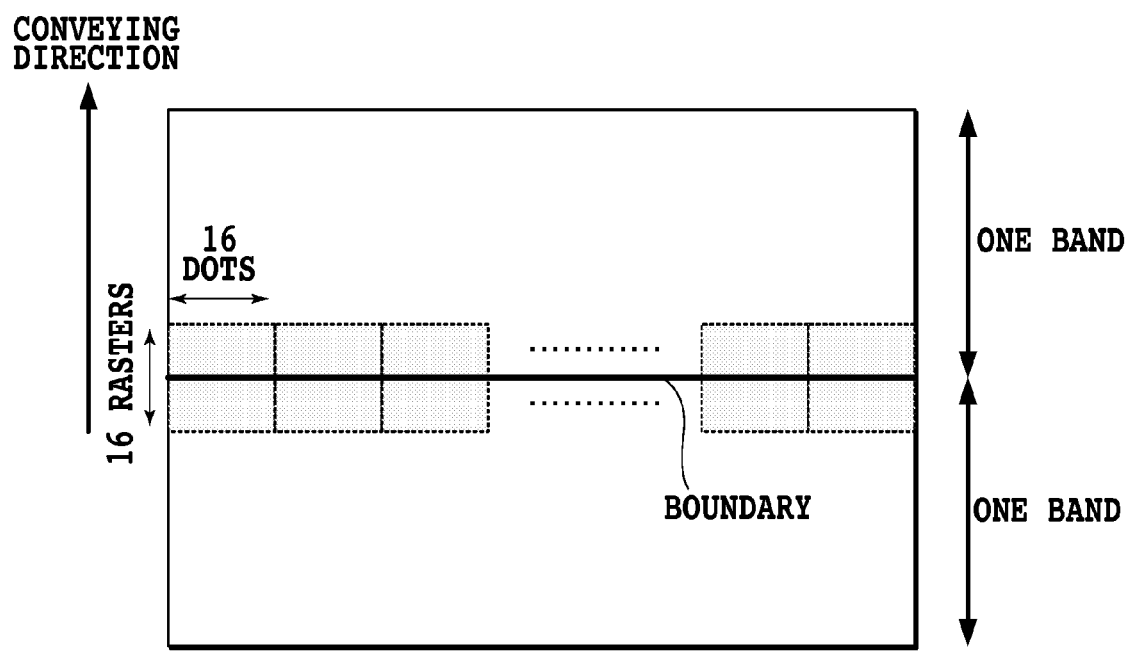
FIG. 7 is a conceptual diagram of a region on which dot count is performed in the procedure shown in FIG. 6.

FIG. 7 is a conceptual diagram of a region on which the dot count is performed in step S702. It is assumed that a unit region which is included in one band and on which the dot count is performed is in the vicinity of the boundary, and that, in this embodiment, the unit region is a region having a width of 8 rasters in a printing medium conveying direction on the upstream side and 8 rasters on the downstream side. Thus, with respect to a band formed in one print scan to be performed from this time and a band formed in the succeeding print scan, the dot count is performed on a region having a width including 8 rasters on the downstream side of boundary and 8 rasters on the upstream side of boundary. Then, the dot count is sequentially performed on each unit region (hereinafter, also referred to as a "dot count unit region") obtained by dividing the above-mentioned region in units of 16 columns (16 dots). Although, in this embodiment, the region extending across the boundary is defined as the unit region, the region (for example, 8 rasters on the downstream side of the boundary) of the end portion of one of the band regions may be defined as the unit region so as not to extend across the boundary.

The dot count is performed on the binary print data of all color inks used in the printing apparatus, specifically, of colors, namely, cyan, magenta and yellow in the apparatus of the embodiment of FIG. 1. Here, if "1" in the binary print data indicates an ejection (dot formation) and "0" indicates a non-ejection (non-dot-formation), the number of "1"s in the unit region is counted. In this embodiment, for each unit region, a dot count value corresponding to the number of ejections of each of the C, M and Y inks is acquired, and, based on those values, the color gamut determination to be described below is made for each unit region.

Based on this determination and the total (a total dot count value) of the dot count values obtained for the individual color inks, the thinning processing on the unit region is performed. The maximum of the total dot count value is 768 (16 (rasters)×16 (columns)×3 (colors)=768).

Color Gamut Determination

Figure 8:
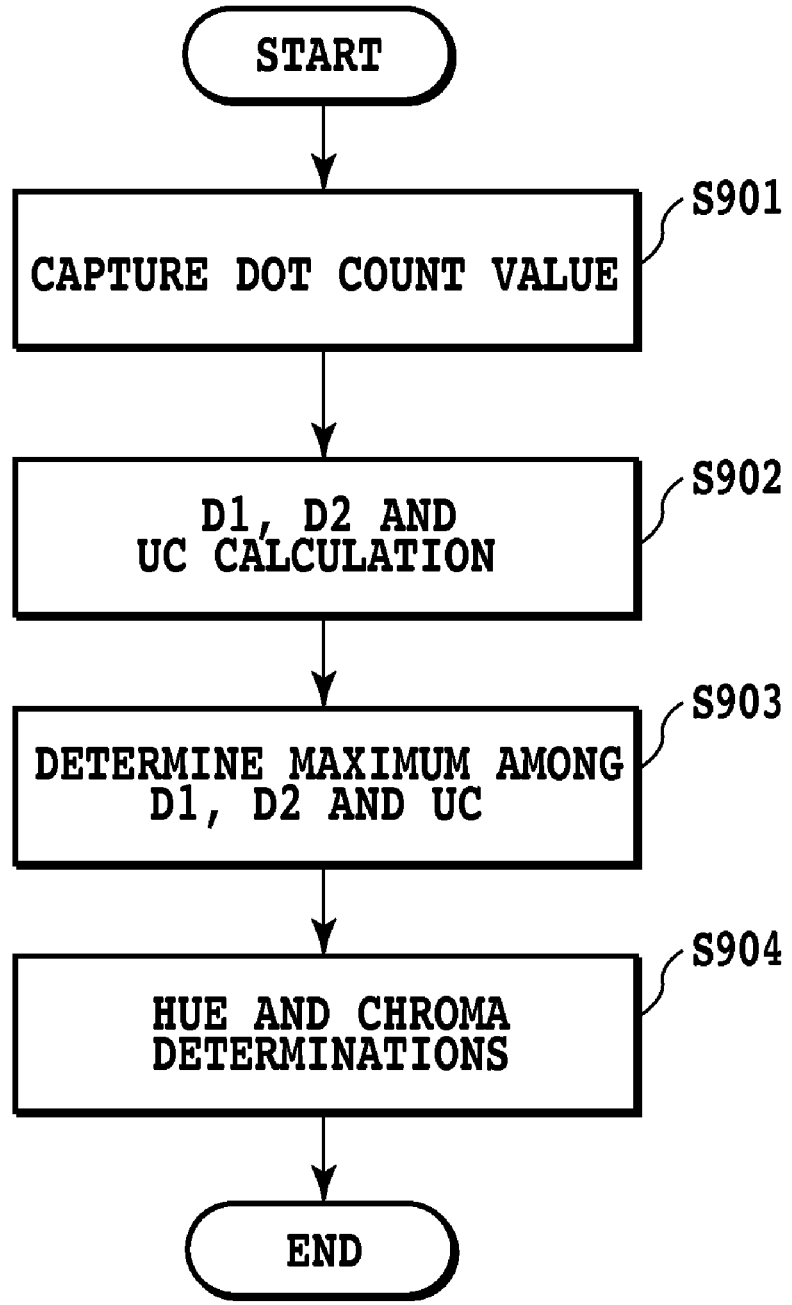
FIG. 8 is a flowchart showing the procedure of color gamut (hue and chroma) determination processing performed in the procedure shown in FIG. 6.

FIG. 8 shows a flowchart of the color gamut determination. First, in step S901, the dot count values for the individual ink colors obtained as described above are captured.

Figure 9:
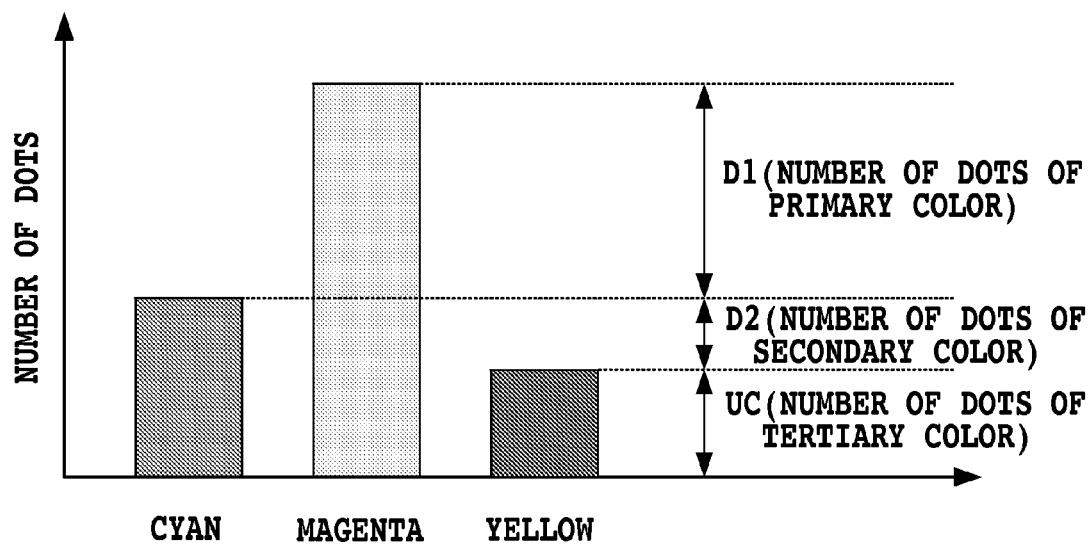
FIG. 9 is a graph illustrating an example of dot count values in a unit region in the first embodiment.
Figure 10:
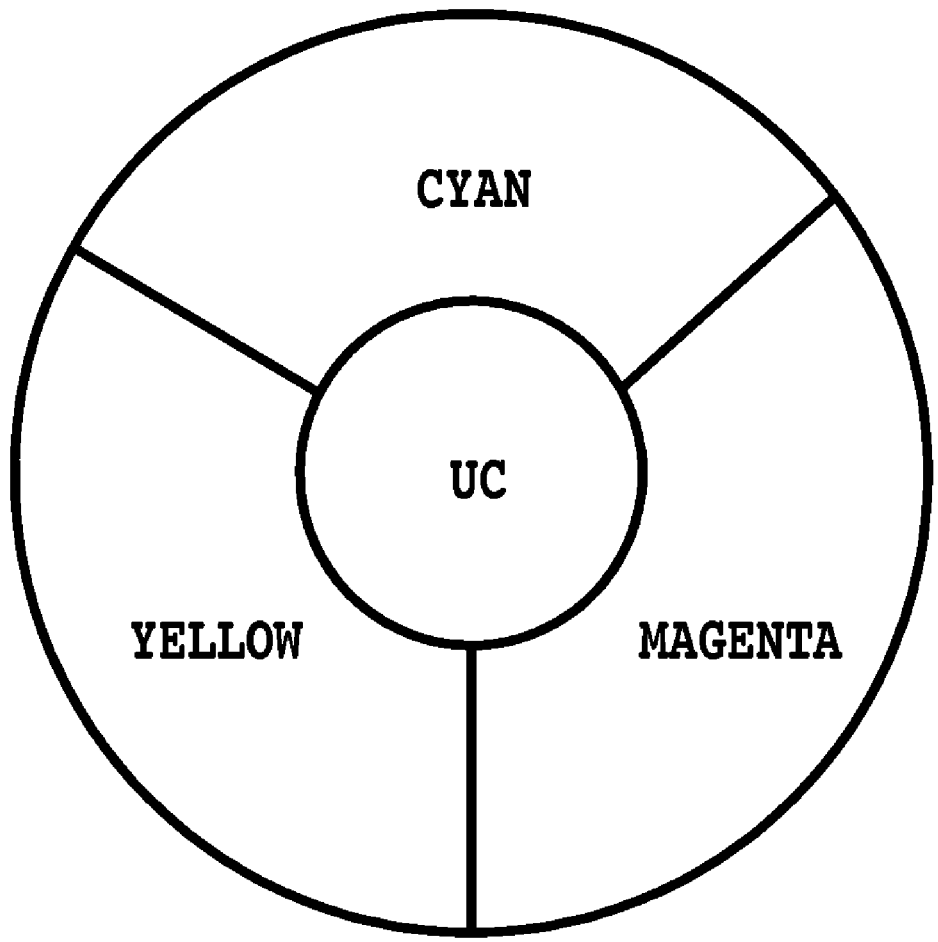
FIG. 10 is a diagram showing the divisions of the color gamut used in the first embodiment.

FIG. 9 shows an example of dot count values in a unit region; FIG. 10 shows the divisions of the color gamut used in this embodiment. In the example of FIG. 9, magenta, cyan and yellow are in the decreasing order of the dot count value. Here, a portion composed of yellow of the least dot count value and cyan and magenta corresponding to a dot count value equal to that of yellow is generally called as the under color (which is also represented by UC). A portion composed of cyan corresponding to a dot count value obtained by subtracting the dot count value of the UC from the original dot count value of cyan and magenta corresponding to the same dot count value is called the secondary color (which is also represented by D2; in the example of FIG. 9, blue). A portion composed of only magenta corresponding to a dot count value obtained by subtracting the dot count values of UC and D2 from the original dot count value of magenta is called the primary color (which is also represented by D1).

Which one of UC, D1 and D2 calculated in step S902 in this way has the largest dot count value is determined (step S903), and thus, it is determined that the unit region of interest falls into which one of the color gamuts in FIG. 10 (step S904). In the example of FIG. 9, D1 is the largest of the three colors, and thus the unit region of interest is determined to be in the color gamut of magenta. When, among D1, D2 and UC, two largest ones or three largest ones exist, as the color gamut, UC, D2 or D1 is employed in this order, that is, in the decreasing order of priority (when UC is equal to D2, UC is employed; when D1 is equal to D2, D2 is employed; actually, D1 is not employed). Therefore, any one of cyan, magenta, yellow, red, green, blue and UC is determined to be the color gamut.

Thinning Rank

Figure 11:
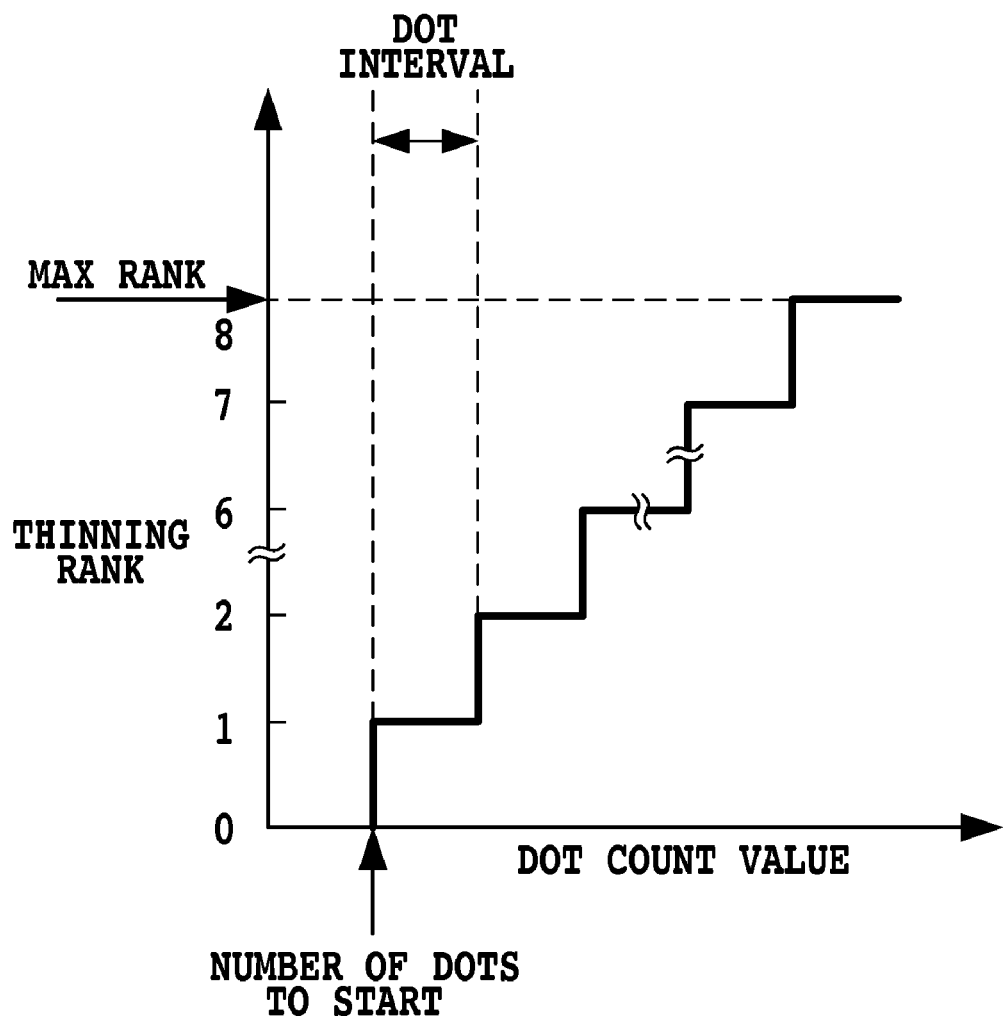
FIG. 11 is a graph illustrating a thinning rank graph used to determine a thinning rank in the first embodiment of the present invention.

FIG. 11 is a diagram illustrating a thinning rank graph that is used to determine a thinning rank; the vertical axis represents a thinning rank corresponding to a thinning rate, and the horizontal axis represents the total dot count value.

In one thinning rank graph, the thinning rate corresponds to the total dot count value at 9 steps, namely, 0%, 12.5%, 25%, 37.5%, 50%, 62.5%, 75%, 87.5% and 100%. FIG. 12 shows the relationship between the thinning rank, thinning data corresponding to the thinning rank and the thinning rate.

In this embodiment, the thinning rank graph is prepared for each of the seven color gamuts determined and obtained as described above and for each ink color (C, M, Y). Specifically, a total of 21 thinning rank graphs (7 color gamuts×3 colors) are prepared; each of the thinning rank graphs has a different correlation between the total dot count value and the thinning rank. When the thinning rank graph is selected (step S704), for each of C, M and Y, the thinning rank graph is first selected according to the color gamut determined in step S703. Then, for each of C, M and Y, the thinning rank is determined from the thinning rank graph selected as described above and the total dot count value of obtained in step S702.

In the example of FIG. 11, the thinning rank is specified with the thinning rank graph by the combination of three parameters, namely, "number of dots to start", "dot interval" and "MAX rank". Among these parameters, the "number of dots to start" refers to a total dot count value at the start of using "thinning rank 1 (thinning rate 12.5%)". The "dot interval" refers to an increase in the total dot count value until the transfer to the one-rank higher thinning rate (12.5% followed by 25%), in other words, the range of the total dot count value when the same thinning rate is used. The "MAX rank" refers to the maximum thinning rate, and a thinning rate higher than this is not selected. That is, when the thinning rate of the "MAX rank" is reached, even if the dot count value in "dot interval" increases, the thinning rate is not increased, and the thinning rate of the "MAX rank" is maintained.

Although, in the example of the figure, the above-described three parameters (the "number of dots to start", the "dot interval" and the "MAX rank") are used to determine the thinning rank, it is needless to say that the method for determining the thinning rank is not particularly limited to this method. In the thinning rank graph of the above example, the relationship between the total dot count value and the thinning rate is substantially linear, and specifically, the constant "dot interval" and the constant increase in the thinning rate (in increments of 12.5%) are evenly formed in the shape of steps. However, the "dot interval" and the increase in the thinning rate may change as appropriate in a non-linear manner. The number of steps of the thinning rate is not limited to 9 steps described above; as needed, the number of steps may be increased or decreased.

In this embodiment, different thinning rank graphs are set for each color gamut and for each ink. The reason for this is the same as that described in Japanese Patent Laid-Open No. 2002-96460. Specifically, this is because, by setting a suitable thinning rate for each ink color according to color gamut, variations in color tone which may occur when the same thinning rate is applied for any color gamut and any ink color are suppressed. It is also possible to cope with the difference of degree of the production of boundary stripes resulting from such as different behaviors on the printing medium due to ink and differences in how stripes are viewed due to differences in lightness and chroma between different inks.

Thinning Processing

In step S705 shown in FIG. 6, the thinning data corresponding to the thinning rank determined for each of ink colors (C, M and Y) as described above are employed on the unit region of interest, and thus the thinning processing is performed on the print data of C, M and Y included in the unit region.

The thinning data used in this example has 8 bits in size as shown in FIGS. 12, and "0" or "1" in each bit represents the thinning of one piece of ejection data (the ejection is not allowed) or the non-thinning thereof (the ejection is allowed). The ejection data refers to data ("1") that indicates the formation of dot by the ejection of ink, in the print data.

How it is applied is as follows. In the thinning data, bits are sequentially specified by an appropriate counter from the most significant bit. Then, each time ejection data is present, the value of the bit specified by the counter is read, and, if it is "1", the ejection data is not thinned, and then the counter moves to the right by one location. If the value of the bit specified by the counter is "0", the ejection data is thinned, and then the counter moves to the right by one location. The counter specifies bits such that, when it moves up to the rightmost end of the thinning data (the least significant bit), it returns to the leftmost end (the most significant bit). Each time ejection data comes, this processing is repeated, with the result that dots to be thinned are determined.

Figure 14:
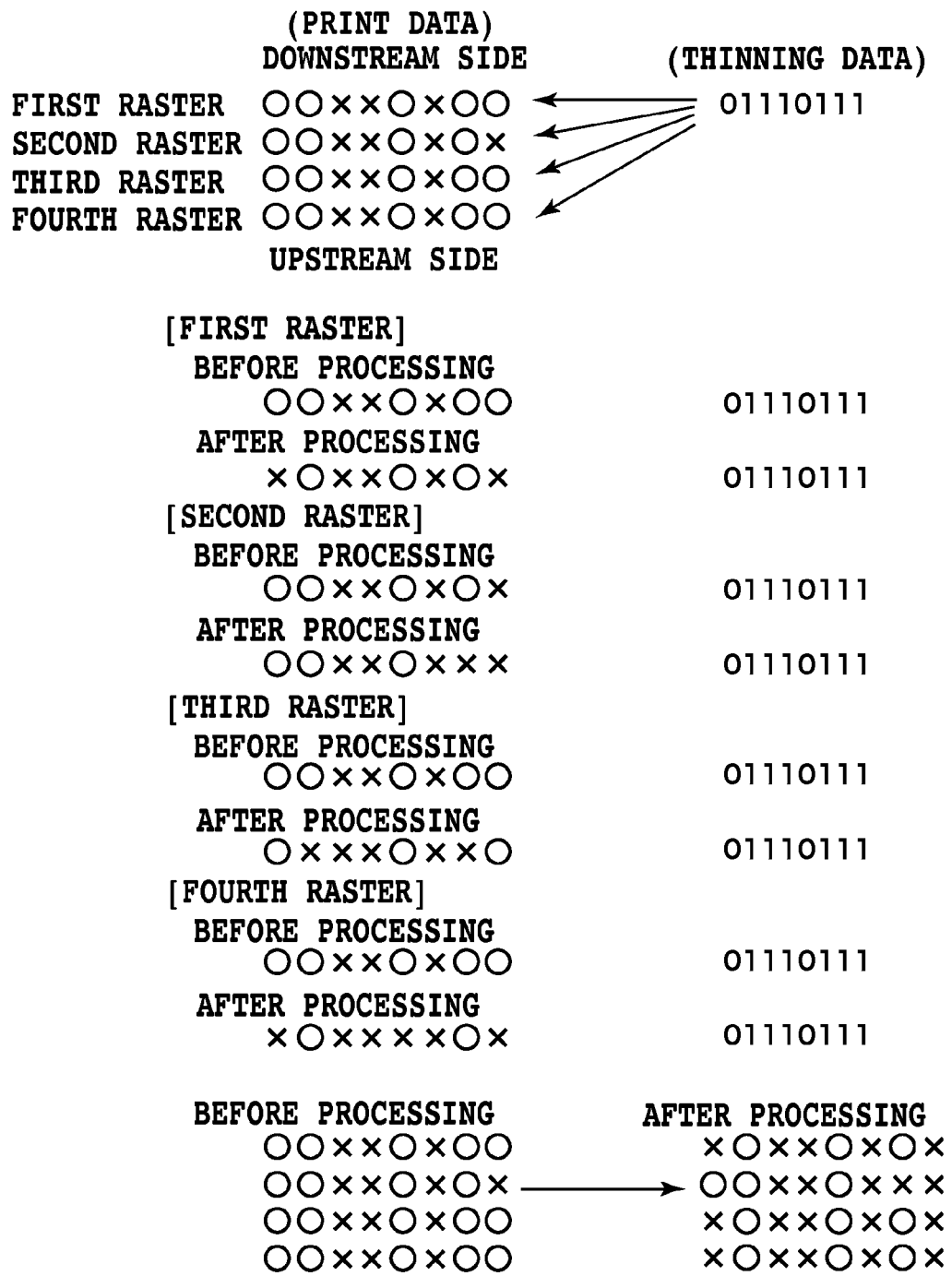
FIG. 14 is a diagram illustrating more specifically the thinning processing of the first embodiment.

With reference to FIGS. 13 and 14, the thinning processing of this embodiment will be more specifically described. In these figures, in the print data, the ejection data is represented by "o", and the data (non-ejection data) with which no dot is formed by no ejection of ink is represented by "x". In FIG. 13, in the print data and the thinning data, the positions of interest are underlined.

In FIG. 13, the first piece of the print data is "o" (ejection data), and the value of the most significant bit of the thinning data is "o", and thus the first piece of the ejection data is thinned. Hence, the first piece of the print data after the processing becomes "x", and the counter moves to the right by one location. The succeeding piece of the data is non-ejection data, and thus it remains "x", and the counter does not move and remains in the same position. In the second piece of the ejection data, since the value of the bit indicated by the counter and positioned in the second location from the most significant bit is "1", the ejection data remains as it is, and the counter moves to the right by one location. In this way, the ejection data is thinned at a ratio of 4 to 1.

FIG. 14 is a diagram more specifically showing the thinning processing on the unit region. As described above, it is assumed that the dot count unit region of this embodiment has a width of 8 rasters both on the upstream side and on the downstream side in the printing medium conveying direction and has a size of 16 columns (16 bits) in a lateral direction. However, for simplification, in FIG. 14, the dot count unit region is shown to have a width of 2 rasters (the total of 4 rasters) both on the upstream side and on the downstream side in the printing medium conveying direction and has a size of 8 columns (8 bits) in a lateral direction. However, the dot count unit region and the thinning processing region do not necessarily need to coincide with each other. Incidentally, in FIG. 14, the rasters are shown as the first raster, the second raster, the third raster and the fourth raster from the most downstream side in the printing medium conveying direction in a sequential manner.

The thinning processing is performed from the rasters on the downstream side on a raster-by-raster basis, and one raster is processed, and then the succeeding raster (the raster on the upstream side) is processed. Here, even when the thinning rank is changed, in this embodiment, the counter can be set such that it does not return to the initial position. The counter can be set such that, in this embodiment, even when the thinning processing region moves to the adjacent region within one band, the counter does not return to the initial position and that the position of the counter is held as is within one band. Then, when the process proceeds to the processing on the different band, the position of the counter can be returned to the initial position.

(Boundary Processing Corresponding to the Lightness)

Figure 15:
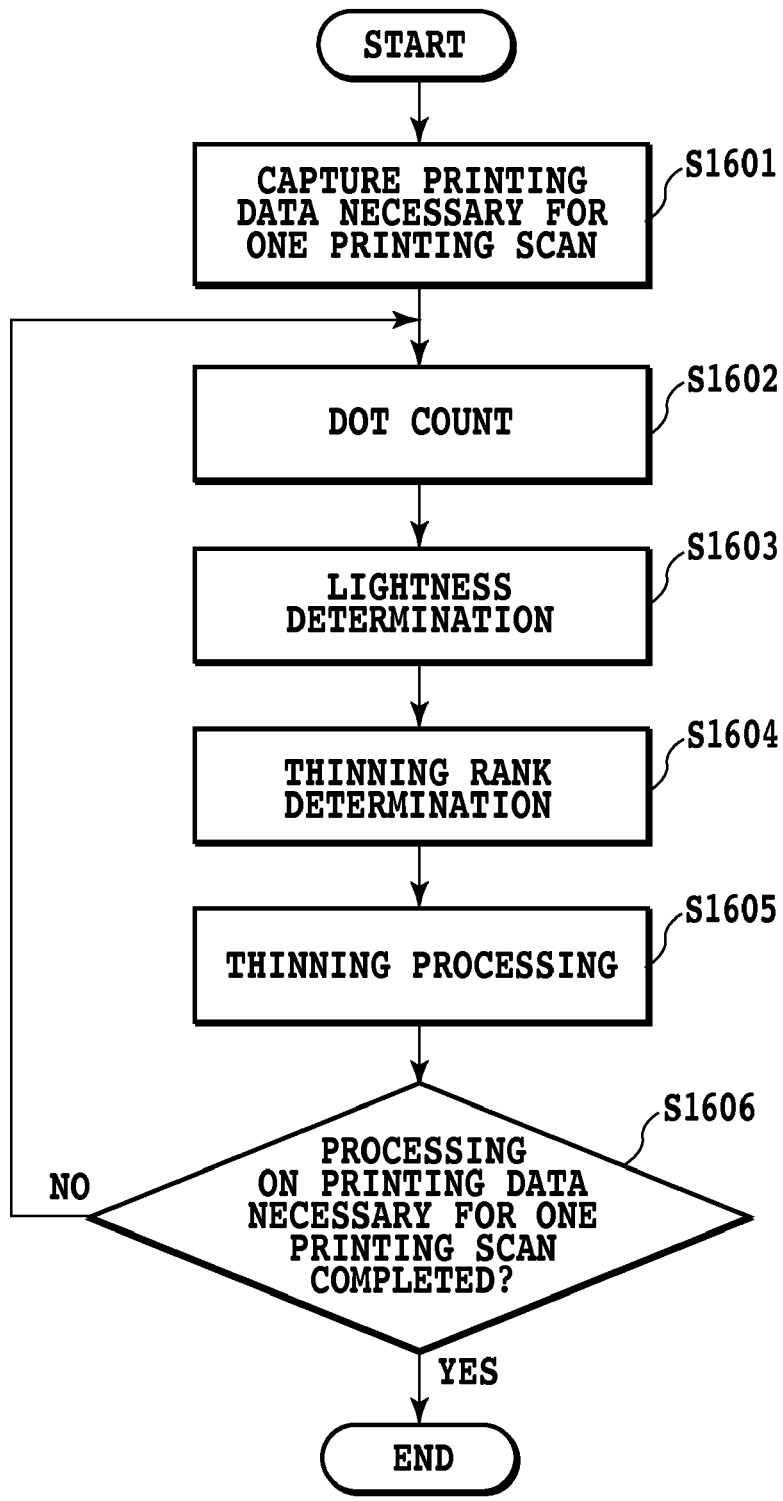
FIG. 15 is a flowchart showing the details of processing for reducing the amount of ink applied according to a lightness that is performed in the procedure shown in FIG. 5.

The boundary processing corresponding to the lightness described in step S604 in the flowchart shown in FIG. 5 will now be described with reference to FIG. 15.

In step S1601, as in step S701 described above, print data necessary for the printing of one print scan corresponding to each color (here, black or light black) ink is captured. Specifically, print data corresponding to a print region (band) formed in one print scan to be performed from this time and print data corresponding to a band formed in the succeeding print scan are captured.

After these print data are acquired, for each unit region of 16 dots in a raster direction and 16 dots in a column direction similar to step S702 described above, dot count is performed in step S1602. That is, the dot count for each of black ink and light black ink as achromatic inks is performed. Then, a lightness determination (step S1603), the thinning rank determination (step S1604) and the thinning processing (step S1605) are performed, and these processings are repeated until the completion of the processing on the print data necessary for the printing of one print scan (step S1606).

Among them, the dot count processing and the thinning processing are substantially the same as in the case of the above-described boundary processing involving the hue determination except that ink to be processed is changed to achromatic one from chromatic one, and thus their detailed description will not be repeated. The lightness determination (step S1603) and the thinning rank determination (step S1604) will be described below.

In the color gamut determination processing (S703) described previously, the hue and the chroma are determined from the dot count values of the chromatic inks, thus it is determined that the unit region falls into which one of the color gamuts, and the thinning processing is performed according to the thinning rate corresponding to the determined color gamut. In contrast, in the lightness determination processing (S1603), a lightness region is determined from dot count values of the achromatic inks, and then the thinning processing is performed according to the thinning rate corresponding to the determined lightness region.

Figure 16A:
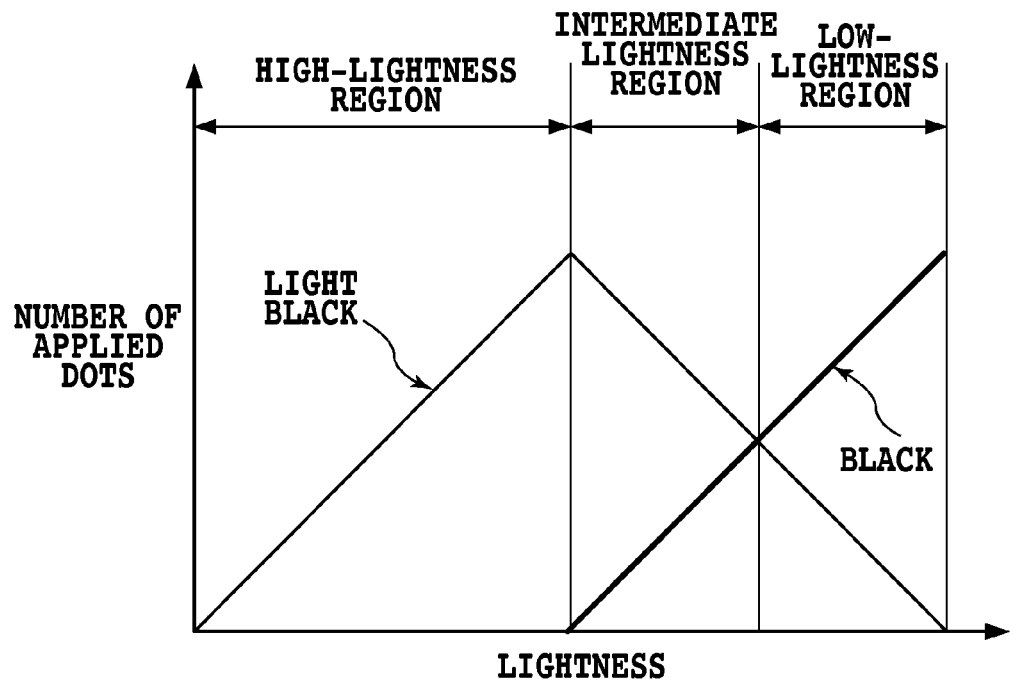
FIGS. 16A and 16B are characteristic diagrams showing two examples of the relationship between a lightness and the number of dots applied, which is a viewpoint unique to the first embodiment.
Figure 16B:
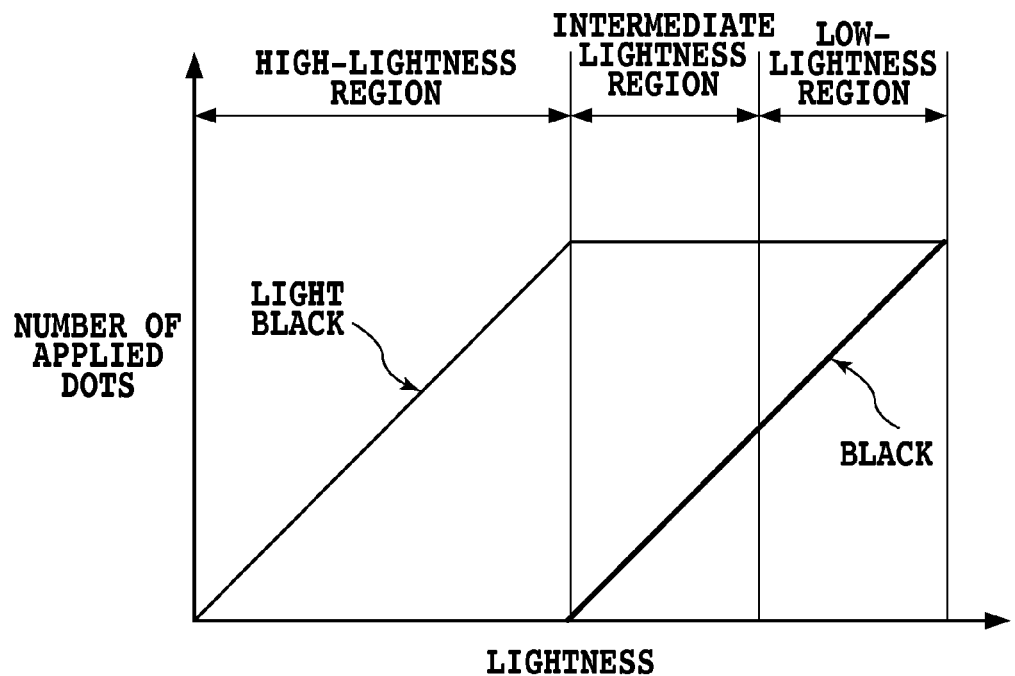

FIGS. 16A and 16B are characteristic diagrams showing two examples of the relationship between a lightness and the number of dots applied, which is a viewpoint unique to this embodiment.

In FIGS. 16A and 16B, the vertical axis represents the number of applied dots of each ink, and the horizontal axis represents a lightness. In this example, light black and black inks are used to form a gray line. In this embodiment, in the gray line from the maximum lightness (white) to the minimum lightness (black), the lightness region in the vicinity of the maximum lightness can be expressed by PCBk (process color black) obtained from color mixture of chromatic colors, namely, yellow, magenta and cyan. In this case, the unit region is determined to fall into the color gamut of UC, and the optimal thinning rank is applied to each of these chromatic color inks. In this embodiment, as the lightness is lowered, inks of achromatic colors, namely, light black and black are used more. That is, in FIGS. 16A and 16B, the relationship with PCBk is not shown, and the original point of the lightness axis expresses a lightness at the start of the use of light black, and not necessarily expresses the point of the maximum lightness (white).

In FIG. 16A, a region where the light black ink is only used is expressed as a high-lightness region for convenience, and, as, in this region, the lightness is lowered, the number of dots of the light black ink is increased. A region from the lightness at which the use of the black ink is started is expressed as an intermediate lightness region, and, as, in this region, the number of applied dots of the black ink is increased, the number of applied dots of the light black ink is decreased. The lightness is lowered such that light black and black just exchange each other. The region from the lightness where this exchange occurs is expressed as a low-lightness region, and, as, in this region, the lightness is lowered, the number of applied dots of the black ink is gradually increased, and the number of applied dots of the light black ink is decreased. In the intermediate lightness region and the low-lightness region, the total of the numbers of applied dots of the light black ink and the black ink is the same as each other.

On the other hand, when the boundary stripes are considered, in light black, it is relatively difficult for stripes and the like to be noticeable, and, in black, it is easier for stripes and the like to be noticeable. In consideration of this characteristic, in the high-lightness region and the intermediate lightness region, it is unnecessary to perform high thinning processing, but, in the low-lightness region, it is preferable to perform relatively high thinning processing. In the low-lightness region, the black ink is dominantly used, but, since there are effects from the light black ink, their interaction needs to be considered. That is, it is preferable to avoid simply making a determination from only the number of dots of the black ink and to perform processing for controlling the degree of the thinning according to the lightness.

FIG. 16B shows a case where the method of using the light black ink is different from that shown in FIG. 16A, but where the method of using the black ink is the same. In the intermediate lightness region and the low-lightness region, the number of applied dots of the light black ink is the same. This is the method of using an ink in which, as compared with the case of FIG. 16A, in the low-lightness region, the change of gradation is increased. Here, when the boundary processing is considered, with respect to the light black ink, even if the number of applied dots is the same, the degree of effects on the boundary stripes is different between the intermediate lightness region and the low-lightness region. After all, it is preferable to avoid simply making a determination from only the number of dots and to perform processing for controlling the degree of the thinning according to the lightness.

In order to determine the lightness, a determination is made from the combination of the numbers of dots of achromatic inks used, namely, the light black ink and the black ink in this embodiment. As shown in FIG. 7, when the unit region on which the dot count is performed has a certain extent, since the combination varies, it is possible to use a table or the like showing the relationship between previously expected combination and the lightness.

FIG. 17 shows an example of a table showing the relationship between the number of dots applied and a lightness region when the first and second inks (in this embodiment, the black ink and the light black ink, respectively) are used. Here, "region 1" refers to a high-lightness region, "region 2" refers to an intermediate lightness region, "region 3" refers to a first low-lightness region and "region 4" refers to a second low-lightness region in the vicinity of the minimum lightness and lower than the first low-lightness region; they agree with the lightness regions shown in the characteristic diagrams in FIGS. 16A and 16B. The reason why the low-lightness region is divided into two regions is that how the boundary stripes are viewed is expected to be different depending on the total of the numbers of dots applied or their combination. The unit region on which the dot count is performed has the extent of 16 dots×16 dots as described above; among the numbers of dots from 0 to 256, any number of dots of the light black ink and/or the black ink is arranged therein. The table of FIG. 17 shows an example in which, with respect to both of the first and second inks, the number of dots arranged is specified as 100% when dots are arranged over the entire unit region and it is specified in increments of 10%. However, it is needless to say that the increment can be determined as appropriate both in the light black ink and in the black ink and that, in the table, the arrangement of "region 1" to "region 4" can be determined as appropriate.

Although FIG. 17 shows a two-dimensional table, it is needless to say that, when the number of types of achromatic inks used is two or more, a table corresponding to such a number is provided. Generally, a three-dimensional table or the like is realistic in terms of capacity however, the configuration of the table is not limited to this.

After the lightness region is determined in this way in S1603, the thinning rank (thinning rate) corresponding to the lightness region is determined in S1604. Specifically, for the determined lightness region, it is possible to determine the thinning rate corresponding to the lightness region determined in S1603, by using a thinning rank table that specifies the correlation between the lightness region and the thinning rate (thinning rank) as shown in FIG. 18A. Thereafter, in S1605, with the thinning rate determined as described above, the thinning processing is performed on the binary print data of the black ink (the first ink) and the light black ink (the second ink).

As described above, the lightness is determined from the number of dots of the achromatic inks used, and, from the results, the thinning rank is determined, and the thinning processing is performed; thus it is possible to appropriately reduce the boundary stripe due to the achromatic inks to which the color gamut determination in Japanese Patent Laid-Open No. 2002-96460 does not give consideration.

(Effects of the First Embodiment)

As described above, in this embodiment, on each of the chromatic and achromatic inks used in each unit region including the boundary and the vicinity thereof, the boundary processing is appropriately performed. Specifically, the boundary processing corresponding to the color gamut is applied to the chromatic colors, and the boundary processing corresponding to the lightness determination is applied to the achromatic colors. Consequently, even if a multi-color ink including chromatic colors and achromatic colors is used, or the number of printing passes is small, it is possible to achieve high-quality image printing without boundary stripes. Moreover, it is possible to suppress an increase in complexity of the processing required when the color gamut determination including achromatic inks is made and an increase in processing load.

(A Variation of the First Embodiment)

In the first embodiment described above, a description is given of the two-step processing in which, first, with the table of FIG. 17, the lightness is determined from a combination of the number of printing dots of the black ink as the first ink and the number of printing dots of the light black ink as the second ink, and then, with the table of FIG. 18A, the thinning rate corresponding to the lightness is determined. However, the two-step processing is not necessarily required; for example, with a table as shown in FIG. 18B, the thinning rate may be directly determined from a combination of the number of dots of the black ink and the number of dots of the light black ink ejected onto the unit region to be processed.

2. Second Embodiment

In the second embodiment of the present invention, as in the first embodiment, appropriate boundary processing is performed on the chromatic color inks and the achromatic color inks. However, in the second embodiment of the present invention, instead of performing the boundary processing corresponding to the determination of the lightness region on the achromatic inks, the boundary processing corresponding to the applied amount of achromatic ink is performed.

Figure 19:
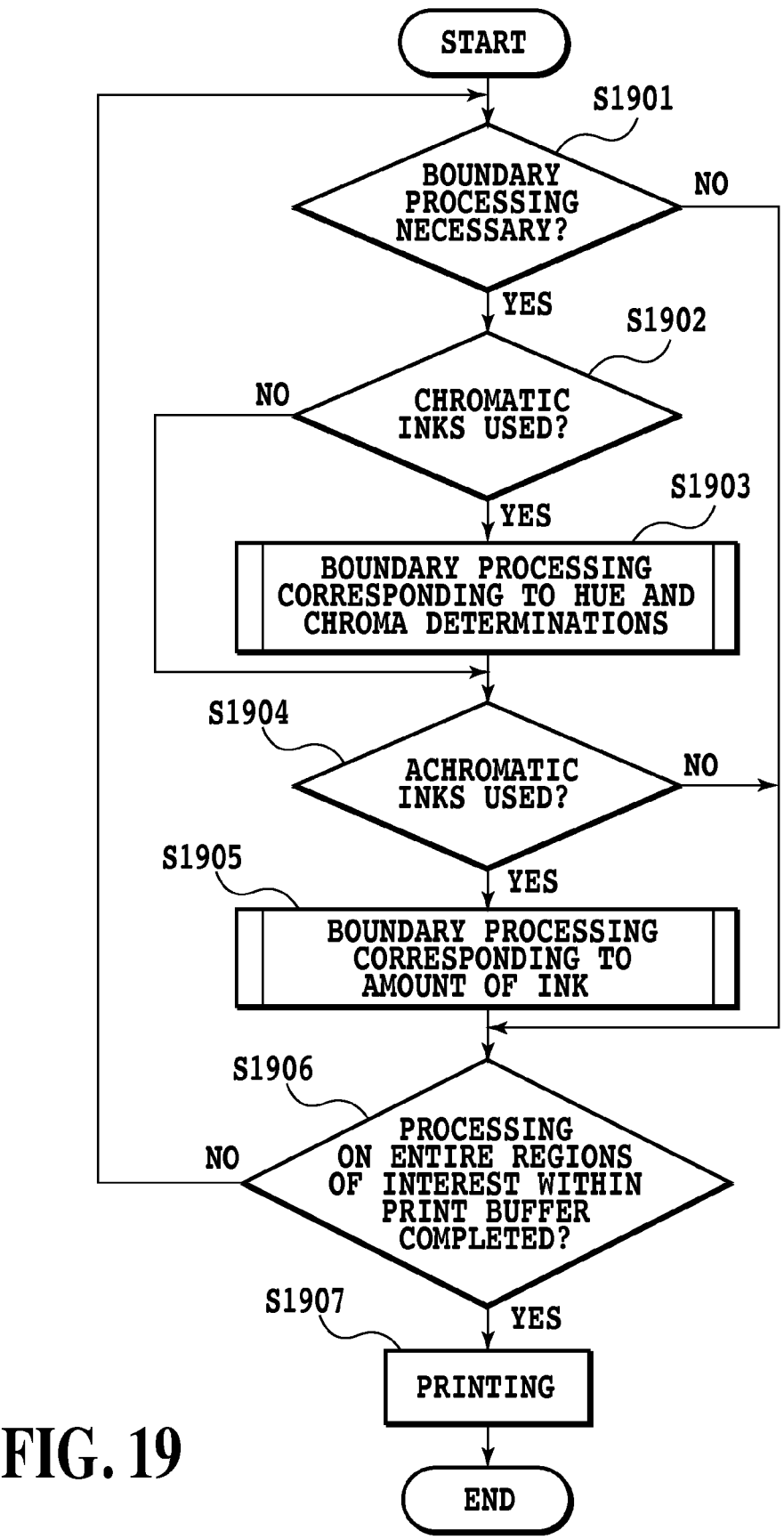
FIG. 19 is a flowchart showing a control procedure according to a second embodiment of the present invention.

FIG. 19 is a flowchart showing a control procedure according to the second embodiment; as in FIG. 5, the flowchart shows a series of steps of the procedure from the receipt of the print start signal and then the selection of the boundary processing corresponding to the chromatic color inks and the achromatic color inks to the start of the printing. Here, the processings performed in steps S1901 to S1904, S1906 and S1907 are the same as those performed in steps S601 to S604, S606 and S607 shown in FIG. 5, respectively.

This embodiment differs from the first embodiment in that, instead of step S605 where the lightness is determined based on the combination of the dot count values of the black and light black inks used in the unit region and where the corresponding boundary processing is performed, step S1905 is provided. In step S1905, the boundary processing is performed directly from the applied amount of each ink in the unit region, that is, the dot count value; this point will be described in detail below.

Figure 20:
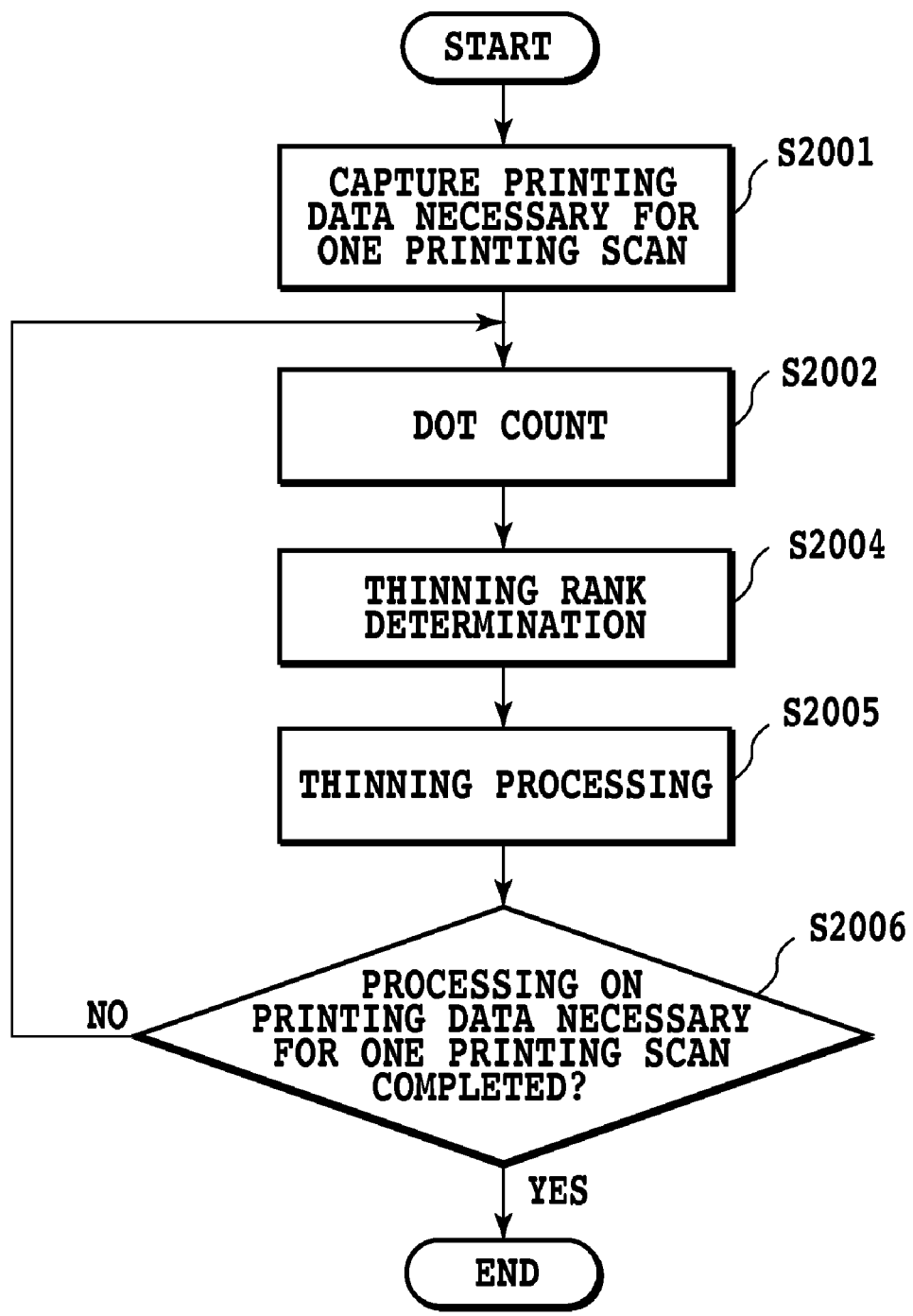
FIG. 20 is a flowchart showing the details of processing for reducing the amount of ink applied according to the amount of ink that is performed in the procedure shown in FIG. 19.

FIG. 20 is a flowchart showing the details of the procedure of the boundary processing performed in step S1905.

In step S2001, print data corresponding to each color ink and necessary for the printing of one print scan is acquired. Specifically, the print data corresponding to the printing region (band) formed in one print scan to be performed from this time and the print data corresponding to the band formed in the succeeding print scan are captured.

After these print data are acquired, for each unit region of 16 dots in a raster direction and 16 dots in a column direction, dot count is performed for each achromatic ink in step S2002. Then, the thinning rank determination (step S2004) and the thinning processing (step S2005) are performed, and these processings are repeated until the completion of the processing on the print data necessary for the printing of one print scan (step S2006).

Here, in the boundary processing corresponding to the amount of ink on the achromatic inks in this embodiment, as similar to the above described boundary processing (S1903) corresponding to the color gamut determination, the thinning rank graph shown in FIG. 11 is used to determine the thinning rate. In the thinning rank graph shown in FIG. 11, as is obvious from its horizontal axis representing the dot count value, the thinning rank can be basically determined by the amount of ink. Moreover, the boundary processing (step S1903) corresponding to the amount of ink on the achromatic inks is similar to the boundary processing (step S1903) corresponding to the determination of the color gamut on the chromatic inks except that the processing for determining the color gamut is not included.

When the boundary stripes are considered, generally, as the amount of ink is large, the boundary stripes tend to be noticeable. However, due to the characteristics of the printing medium, the phenomena of stripe producing may be different. For example, when the amount of ink is larger than a certain level, the ink rapidly overflows to produce stripes. In contrast, when the amount of ink is larger than a certain level, for example, the level of the stripes remains unchanged.

Figure 21:
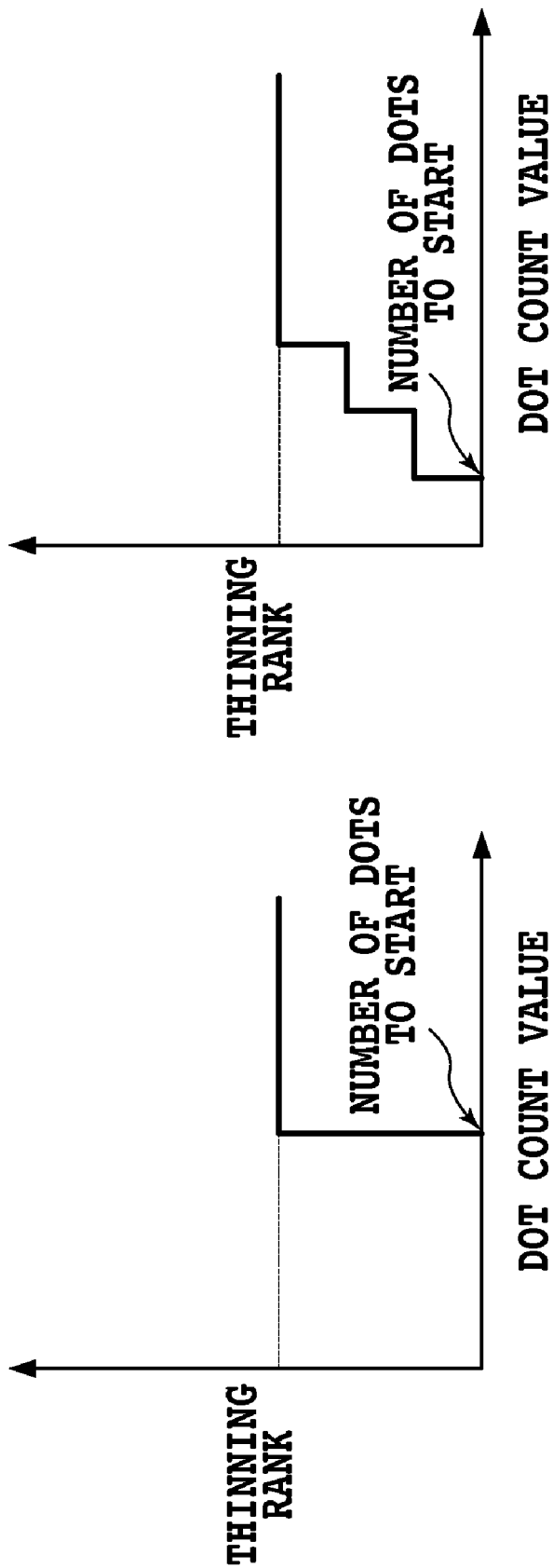
FIGS. 21A and 21B are graphs showing two examples of the relationship between the amount of ink and the thinning rank.

FIGS. 21A and 21B relate to thinning rank graphs used in the connecting processing in step S1905. Each of the thinning rank graphs shows the relationship between the applied amount of the achromatic ink and the thinning rank.

In these figures, the vertical axis represents the thinning rank, and the horizontal axis represents the dot count value. When the processing is performed on one type of the ink ejection amount, it can be treated that the amount of ink uniquely corresponds to the dot count value. If the ink ejection amount can be set at a plurality of steps, the dot count value is preferably recalculated by reflecting the ratio between the plurality of steps of ink ejection amounts. In either case, the thinning rank corresponding to the amount of ink can be determined from the dot count value.

FIG. 21A shows the rank graph provided in order to cope with a case where, at the amount of ink equal to or more than a certain level, the ink rapidly overflows to produce boundary stripes. In this graph, the "number of dots to start" is set as a threshold value, and a specific thinning rank is determined if the amount of ink is equal to or more than the threshold value. FIG. 21B shows the rank graph provided in order to cope with a case where, from the amount of ink equal to or more than a certain level, the ink rapidly overflows to produce boundary stripes. In this graph, up to the certain level, the thinning rank is gradually increased according to the amount of ink, and when it is equal to or more than a certain value, the thinning rank is made constant.

In this way, the thinning rank is determined according to the amount of ink used, and the thinning processing is performed; thus it is possible to appropriately perform the thinning processing on the image area that cannot be separated sufficiently at the color gamut determination.

In the actual printing apparatus, a common control flow for the boundary processing on the chromatic inks and the achromatic inks is employed, and, according to whether the ink to be processed is chromatic or achromatic, whether or not the color gamut determination is performed can be switched. For example, the boundary processing is performed one time on each of the chromatic inks, namely, cyan, magenta and yellow, and the same boundary processing is performed again on the achromatic ink except that the color gamut determination is not performed and the thinning rank graph for the achromatic ink is employed. In this way, it is possible to realize this embodiment even when the common hardware portions such as the gate array are used.

As described above, even in this embodiment, the appropriate boundary processing is performed on each of the chromatic and achromatic inks. In this embodiment, the boundary processing corresponding to the color gamut determination is applied to the chromatic inks, and the boundary processing corresponding to the amount of ink is applied to the achromatic inks. Thus, it is possible to obtain the same benefits as in the first embodiment.

3. Third Embodiment

In the third embodiment of the present invention, as in the first and second embodiments, the boundary processing for the chromatic inks and the boundary processing for the achromatic inks are performed. However, in this embodiment, either or both of the boundary processing for the chromatic inks and the boundary processing for the achromatic inks are performed according to the type of printing medium used.

Figure 22:
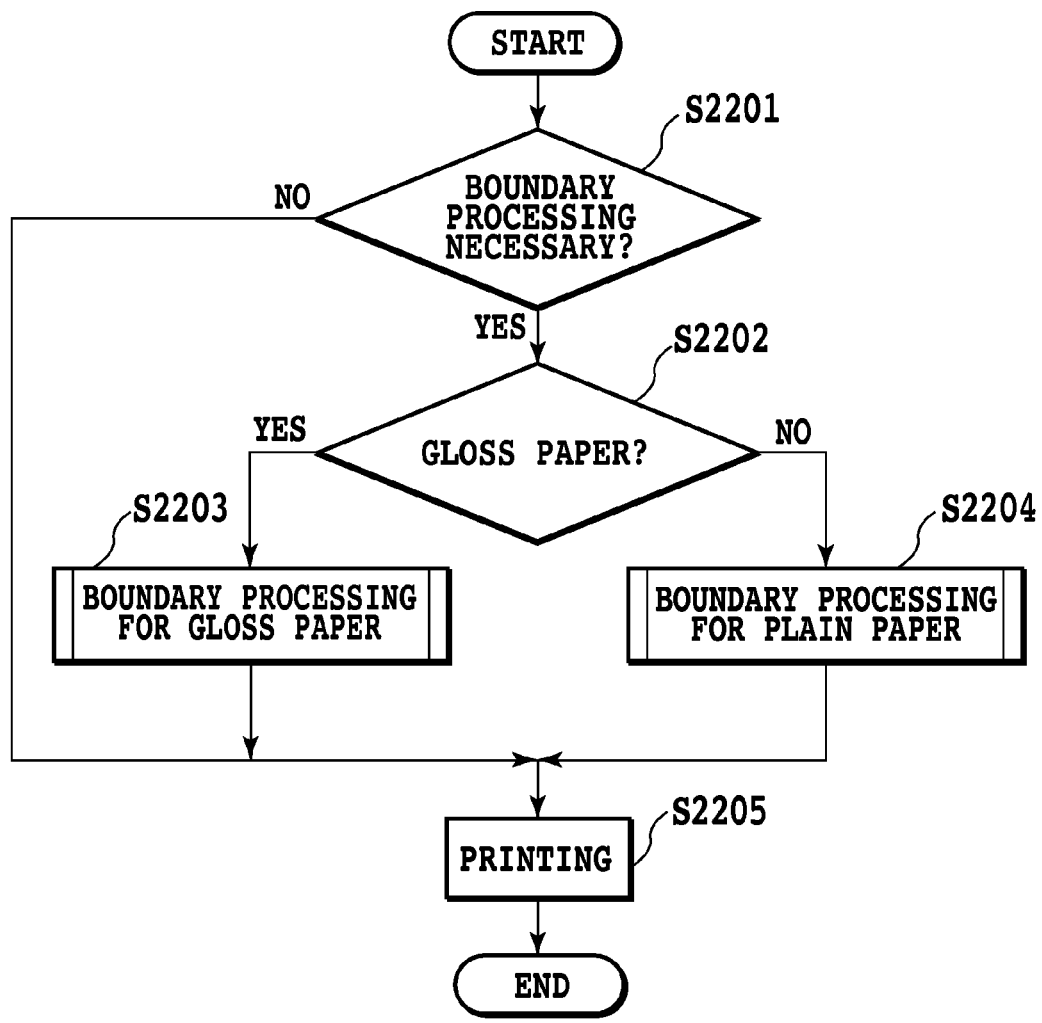
FIG. 22 is a flowchart showing a control procedure according to a third embodiment of the present invention.

FIG. 22 is a flowchart showing a control procedure according to the third embodiment, and shows a series of procedures until the start of the printing. Here, the processings performed in steps S2201 and S2205 are the same as those performed in steps S601 and S605 shown in FIG. 5, respectively.

This embodiment differs from the first embodiment in that the determination of the type of printing medium used and the corresponding processing are performed. These points will be described in detail below.

In step S2202, a determination is made as to what printing medium is used for printing. Specifically, in this embodiment, whether or not the printing medium is gloss paper is determined. As described in the first embodiment, this determination can be performed based on the printing control information supplied along with the print start signal and the image data from, for example, the host computer 401, in particular, printing medium information included in the printing control information.

Here, if the printing medium is determined to be gloss paper, the process proceeds to step S2203 where processing for gloss paper is performed. If the printing medium is not gloss paper, the printing medium used is determined to be plain paper, and the process proceeds to step S2204 where processing for plain paper is performed.

Here, in the processing for gloss paper, with the same procedure as shown in FIG. 5, both of the boundary processing corresponding to the color gamut determination on the chromatic inks and the boundary processing corresponding to the lightness on the achromatic inks can be performed. In the processing for plain paper, without consideration of the achromatic inks, the boundary processing corresponding to the color gamut determination on the chromatic inks can only be performed.

This is for the following reasons. The gloss paper is often used when high-quality image printing is desired; not only the chromatic (cyan, magenta and yellow) inks but also the achromatic (black and light black) inks are often used actively. Thus, in order to achieve the high-quality image printing according to the user's desire, in terms of reducing the boundary stripes, the boundary processing is preferably applied to each of the chromatic inks and the achromatic inks.

In contrast, the plain paper is not often used when high-quality image printing is desired; when color printing is performed, the achromatic ink, especially, light black ink, is not often used. As the black ink, an ink with low permeation property may be used in consideration of quality on the printing of letters; this ink spreads relatively slightly, and the boundary stripes are difficult to occur. Thus, when the plain paper is selected, without consideration of the boundary processing on the achromatic inks, the boundary processing on the chromatic inks are only performed. Since the plain paper is often used when the user desires high-speed printing, it is preferable to reduce the number of processings performed from this viewpoint.

As described above, according to the type of printing medium used, a selection is made as to whether both of the boundary processing on the chromatic inks and the boundary processing on the achromatic inks or the former alone is performed, and thus it is possible to achieve printing corresponding to the user's desire.

Although this embodiment deals with gloss paper and plain paper, the type of printing medium is not limited to these two; it is needles to say that the configuration can be realized in consideration of the use of a printing medium such as coat paper or cloth.

4. Fourth Embodiment

The fourth embodiment of the present invention is suitable for a configuration in which it is possible to perform printing by moving the printing head across the same area on the printing medium one time or more. The boundary processing in which the thinning processing differs according to the number of passes is applied to the configuration. In this embodiment, the boundary processing procedure is branched according to the number of passes, and thus the boundary processing suitable for the number of passes is performed.

Figure 23:
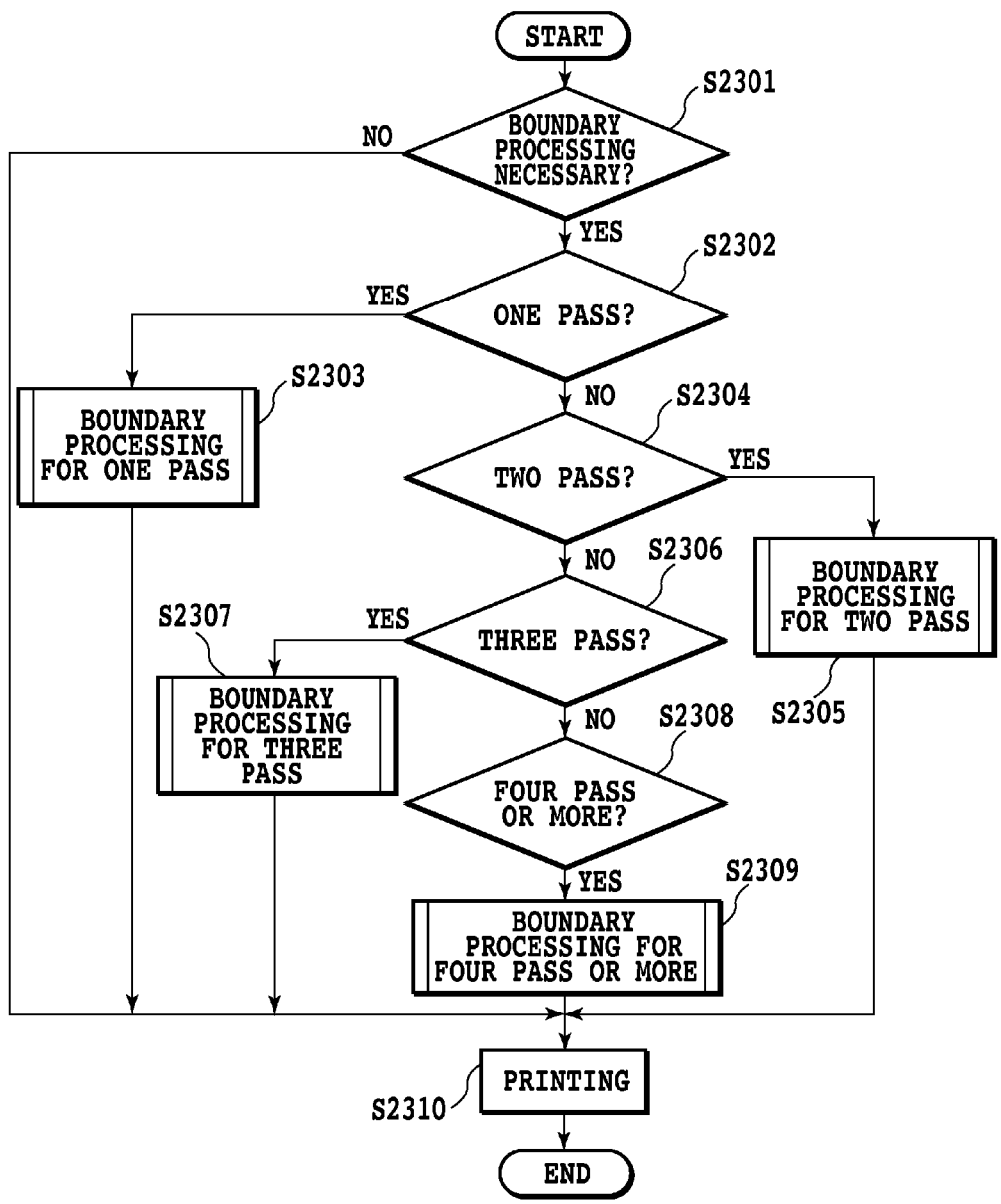
FIG. 23 is a flowchart showing a control procedure according to a fourth embodiment of the present invention.

FIG. 23 is a flowchart showing a control procedure according to the fourth embodiment. This flowchart shows that whether or not the boundary processing is needed is determined, and that then the boundary processing corresponding to the number of passes is finally selected.

First, in step S2301, whether or not the boundary processing is needed is determined. If the boundary processing is determined to be needed, the process proceeds to step S2302. If the boundary processing is determined not to be needed, the process proceeds to step S2310.

In step S2302 and the subsequent steps, according to the number of passes at the time of the printing, the boundary processing applied is switched. First, in step S2302, whether or not one pass printing is specified is determined. Here, if a positive determination is made, the process proceeds to step S2303 where the boundary processing for one pass printing is performed. On the other hand, if a negative determination is made, the process proceeds to step S2304 where whether or not two pass printing is specified is determined.

If, in step S2304, a positive determination is made, the process proceeds to step S2305 where the boundary processing for two pass printing is performed. If a negative determination is made, the process proceeds to step S2306 where whether or not three pass printing is specified is determined.

If, in step S2306, a positive determination is made, the process proceeds to step S2307 where the boundary processing for three pass printing is performed. If a negative determination is made, the process proceeds to step S2308 where whether or not four or more pass printing is specified is determined. Then, the boundary processing for four or more pass printing is performed.

Here, since the boundary stripes tend to be more significant as the number of passes is smaller, different thinning rank graphs are applied according to the number of passes. For example, in this embodiment, as the number of passes is smaller, the boundary processing in which the thinning rate is increased even when the total dot count value is small is applied. Even when any number of passes is used, both of the boundary processing on the chromatic inks and the boundary processing on the achromatic inks are applied as described in the first embodiment.

As described above, the boundary processing is performed according to the number of passes on the printing, and thus the thinning processing suitable for such a pass number is performed, with the result that it is possible to achieve high-quality printing with reducing boundary stripes.

The boundary on which the boundary processing is performed in the multi-pass printing is the adjacent portion between an end portion of a band printed in a certain print scan and an end portion of a band printed in another print scan. Specifically, for example, in two-pass printing, the boundary becomes the adjacent portion between an end portion on the downstream side in the printing medium conveying direction of a band printed in the first pass and an end portion on the upstream side in the printing medium conveying direction of a band printed in the third pass.

5. Others

The present invention acquires, for each of a plurality of unit regions obtained by dividing (partitioning) a region in the vicinity of a boundary of bands, information on ink applied to the unit region. Among a plurality of reduction processings that can be performed as reduction processing for reducing the amount of ink applied to the unit region, a reduction processing corresponding to the acquired information is performed. In particular, the present invention is characterized by including, as a plurality of reduction processings, (A) reduction processing for determining a hue of the unit region based on information on the amount of chromatic ink applied to the unit region to reduce the applied amount of chromatic ink according to the determined hue; and (B) reduction processing for reducing the applied amount of achromatic ink according to information on the amount of achromatic ink applied to the unit region.

It is needless to say that the present invention is not limited to the above-described embodiments as long as variations and modifications do not depart from the technical ideas of the present invention. For example, in the above-described embodiment, the boundary processing (the reduction processing for reducing the amount of ink applied to the unit region) is performed based on the binary print data. However, based on multivalued print data before being binarized, color (hue, lightness, chroma, the amount of ink and the like) is determined, and, based on the determination results, the value of the multivalued data may be reduced. Moreover, based on the determination results on the multivalued print data, the boundary processing can be performed on the binary print data.

The above-described embodiments can be combined together as appropriate. For example, the third and fourth embodiments may be combined together.

Although, in the above examples, as the chromatic inks, the inks of three colors, namely, cyan, magenta and yellow are used, light inks such as light cyan ink and light magenta ink or the so-called particular color inks such as red, green and blue inks may be used. In the above examples, as the achromatic inks, black and light black (gray) inks are used. However, achromatic colors for use in expressing the gray line from white (the maximum lightness) to black (the minimum lightness) are not limited to these two types of inks. Black ink only may also be used. Alternatively, more than two types of black inks with different density of black colorant each other may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-323801, filed Dec. 19, 2008, which is hereby incorporated by reference herein in its entirety.

What is claimed is:

1. An inkjet printing apparatus which performs printing on a printing medium by ejecting ink from a printing unit configured to eject a plurality of chromatic inks and a plurality of achromatic inks while moving the printing unit relative to the printing medium, comprising:
   an acquiring unit configured to acquire, for each unit region obtained by dividing a region including a vicinity of a boundary between bands to be printed by movements of the printing unit, information on amounts of inks to be applied to the unit region with respect to each ink color; and
   a reduction processing unit configured to perform a first reduction processing which determines a hue of the unit region based on the information on the amounts of the chromatic inks to be applied to the unit region acquired by the acquiring unit and reduces each of the amounts of the chromatic inks to be applied to the unit region according to the determined hue and a second reduction processing which reduces each of the amounts of the achromatic inks to be applied to the unit region based on the information on the amounts of the achromatic inks to be applied to the unit region acquired by the acquiring unit.

2. The inkjet printing apparatus as claimed in claim 1, wherein the plurality of achromatic inks includes a black ink and a light black ink lower in density than the black ink, and wherein the second reduction processing includes:
   processing which determines a lightness of the unit region based on information on amounts of the black and light black ink to be applied to the unit region;
   processing which determines, according to the determined lightness, a reduction rate for reducing each amount of the black and light black ink to be applied to the unit region; and
   processing which reduces, according to the determined reduction rate, the amount of the black ink and the light black ink to be applied to the unit region.

3. The inkjet printing apparatus as claimed in claim 1, wherein the plurality of achromatic inks includes a black ink and a light black ink lower in density than the black ink, and wherein the second reduction processing includes:
   processing which determines, based on a combination of information on an amount of the black ink to be applied to the unit region and information on an amount of the light black ink to be applied to the unit region, a reduction rate for reducing each amount of the black and light black ink to be applied to the unit region; and
   processing which reduces, according to the determined reduction rate, the amount of the black and light black ink to be applied to the unit region.

4. The inkjet printing apparatus as claimed in claim 1, wherein the chromatic inks include cyan, magenta and yellow ink and wherein the first reduction processing includes:
   processing which determines the hue of the unit region based on information on amounts of cyan, magenta and yellow ink to be applied to the unit region;
   processing which determines, according to the determined hue, a reduction rate for reducing each amount of the of cyan, magenta and yellow ink to be applied to the unit region; and
   processing which reduces, according to the determined reduction rate, the amounts of cyan, magenta and yellow ink to be applied to the unit region.

5. The inkjet printing apparatus as claimed in claim 1, further comprising a determining unit configured to determine a type of the printing medium to be used; and
   a selecting unit configured to select, according to the type of the printing medium determined by the determining unit, an execution mode for executing both the first reduction processing and the second reduction processing or execution mode for executing only the first reduction processing.

6. An inkjet printing method of performing printing on a printing medium by ejecting ink from a printing unit configured to eject a plurality of chromatic inks and a plurality of achromatic inks while moving the printing unit relative to the printing medium comprising the steps of:

acquiring, for each unit region obtained by dividing a region including a vicinity of a boundary between bands printed by movements of the printing unit, information on amounts of inks to be applied to the unit region with respect to each ink color; and performing a first reduction processing which determines a hue of the unit region based on the information on the amounts of the chromatic inks to be applied to the unit region acquired by the acquiring step and reduces each of the amounts of the chromatic inks to be applied to the unit region according to the determined hue and a second reduction processing which reduces each of the amounts of the achromatic inks to be applied to the unit region based on the information on the amounts of the achromatic inks to be applied to the unit region acquired by the acquiring step.

7. A method of image processing for a printing apparatus which performs printing by ejecting ink from a printing unit capable of ejecting a first achromatic ink and a second achromatic ink while moving the print unit relative to a printing medium comprising the steps of:

acquiring, for each unit region obtained by dividing a region including a vicinity of a boundary between bands printed by movements of the printing unit, information on an amount of the first achromatic ink to be applied and information on an amount of the second achromatic ink to be applied; and generating print data to reduce at least one of the amount of the first achromatic ink to be applied to the unit region and the amount of the second achromatic ink to be applied to the unit region, based on information on the amount of the first achromatic ink to be applied and information on the amount of the second achromatic ink to be applied.

8. The method of image processing as claimed in claim 7, wherein the generating step comprises determining a lightness gamut of an image to be printed in the unit region and generating print data to reduce at least one of the amount of the first achromatic ink to be applied to the unit region and the amount of the second achromatic ink to be applied to the unit region based on the determined lightness gamut.

* * * * *